United States Patent [19]
Hausauer et al.

[11] Patent Number: 5,659,789
[45] Date of Patent: Aug. 19, 1997

[54] STOPCLOCK TOGGLE SYSTEM FOR POWERING TWO CPUS FROM A REGULATOR ONLY SIZED FOR ONE CPU

[75] Inventors: Brian S. Hausauer, Spring; Thomas R. Seeman, Tomball, both of Tex.

[73] Assignee: Compaq Computer Corporation, Houston, Tex.

[21] Appl. No.: 573,963

[22] Filed: Dec. 15, 1995

[51] Int. Cl.[6] .................................................. G06F 1/10
[52] U.S. Cl. .............................. 395/750.04; 395/182.08; 395/182.2; 395/560; 364/228.3; 364/273.3; 364/DIG. 1
[58] Field of Search ....................... 395/800, 750, 395/182.08, 182.2; 364/228.3, 273.3, DIG. 1

[56] References Cited

U.S. PATENT DOCUMENTS

| | | | |
|---|---|---|---|
| 4,823,262 | 4/1989 | Calle | 395/550 |
| 5,465,366 | 11/1995 | Heineman | 395/750 |

OTHER PUBLICATIONS

Intel Pentium® Pro Processor Power Distribution Guidelines, Application Note AP–523, Nov. 1995.

*Primary Examiner*—Alyssa H. Bowler
*Assistant Examiner*—John Harrity
*Attorney, Agent, or Firm*—Pravel, Hewitt, Kimball & Krieger

[57] ABSTRACT

The present invention relates to a fault tolerant system for providing power to a multiple central processing unit computer system. Three DC-DC converters, each sized for providing power to one central processing unit, furnish power to two central processing units through two power planes. Each DC-DC converter has an output voltage level selectable through a voltage identification signal. If the voltage identification signals of the converters match, identification logic couples the power planes together. If only one converter is available to power the two central processing units, a stopclock logic circuit alternatively places the central processing units in known stopclock modes. Thus, the single converter only has to fully power one central processing unit at any one time.

26 Claims, 16 Drawing Sheets

STOPCLOCK TOGGLE SYSTEM FOR POWERING TWO CPUS FROM A REGULATOR ONLY SIZED FOR ONE CPU

BACKGROUND OF THE INVENTION

1. Field of the Invention

The present invention relates to providing fault tolerant power to a computer system, and more particularly, to a control system for controlling the distribution of power to central processing units of the computer system.

2. Description of the Related Art

With the ever increasing amount of data being processed by today's computer systems, it is often desirable to have a mass storage subsystem to transfer large amounts of data to and from the computer system. Such a mass storage subsystem is commonly found in a local area network (LAN), wherein information and files stored on one computer, called a server, are distributed to local work stations having limited or no mass storage capabilities.

Because the work stations depend on the server for furnishing their mass storage needs, it is crucial the server remains on-line. A circuit of the server typically having a relatively low reliability and short lifetime is a AC-DC converter or adaptor which is used to regulate and furnish power to components of the server.

To compensate for its relatively short lifetime, redundant AC-DC converters are used, so that if one converter fails, uninterrupted power is still furnished to the server. More particularly, each central processing unit (CPU) of the server might have more than one AC-DC converter furnishing its power in order to ensure reliability for the LAN.

Because of the high operating frequencies and performance required of modern CPUs, minor variations in the fabrication of the CPU affect the performance of the CPU. It has been discovered that optimal performance of the CPU often occurs at a specific supply voltage level. In those cases, each CPU is tested by the manufacturer and assigned a required supply voltage level.

One such CPU is the Pentium Pro microprocessor manufactured by Intel. Each Pentium Pro microprocessor is tested by the manufacturer to find its optimal supply voltage level. Computer systems or servers incorporating the CPU must furnish this supply voltage level to the CPU. Thus, if the server has several CPUs, several different CPU supply voltage levels may be required.

If more than one CPU is located in the server, a problem arises in providing fault tolerant power to the multiple CPUs because each CPU might require a different supply voltage level. Thus, redundant power for all of the CPUs cannot be provided by paralleling all of the DC-DC converters which provide the variable supply voltage to the CPUs as they furnish different output voltage levels for different CPUs.

Furthermore, the fault tolerant power system furnished by parallel DC-DC converters cannot be extended to the situation in which only one DC-DC converter is operational and more than one CPU requires power from the single converter. Typically, each DC-DC converter is sized to power only one CPU in its normal mode of operation. Thus, attempting to preserve the functionality of more than one CPU from a single DC-DC converter results in the shutdown of the converter and the server.

SUMMARY OF THE INVENTION

The present invention relates to a fault tolerant subsystem for providing power to central processing units (CPU) s of a computer system. The subsystem accommodates CPUs requiring different supply voltage levels.

A first CPU is coupled to both a first DC-DC converter and a second DC-DC converter which furnish a required supply voltage level of the first CPU through a first power plane. A third DC-DC converter provides a required supply voltage level of a second CPU through a second power plane.

The first and second DC-DC converters receive a first voltage identification signal, and the third DC-DC converter receives a second voltage identification signal. Both of the voltage identification signals are indicative of the required supply voltage levels. If the first and second voltage identification signals are equal, then the same supply voltage levels are provided to both the first and second CPUs.

An identification logic circuit receives both the first and second voltage identification signals and provides a redundancy signal which is indicative of the comparison of these two voltage identification signals. The redundancy signal is used to activate a switch circuit provided for coupling the first and second power planes together in order to furnish fully redundant power to the computer system.

If the two voltage identification signals are equal, then the identification logic activates the switch circuit which couples the first and second power planes. However, if the voltage identification signals are unequal, then the identification logic does not activate the switch circuit, and the power planes remain electrically isolated.

The present invention also relates to providing power to the first and second CPUs when only one DC-DC converter is installed and operational. The DC-DC converter is only slightly oversized for one CPU; therefore, the DC-DC converter cannot supply power to both CPUs if they are concurrently operating in a normal mode of operation.

When one DC-DC converter must power two CPUs, a stopclock toggle circuit coupled to both the first and second CPUs places the CPUs in alternative stopclock modes. In the stopclock mode, the CPU consumes considerably less power. The DC-DC converter can power one CPU in the stopclock mode and one CPU that is in the normal mode. Thus, the converter and CPUs do not have to shut down, and the functionality of each CPU is preserved.

BRIEF DESCRIPTION OF THE DRAWINGS

A better understanding of the present invention can be obtained when the following detailed description of the preferred embodiment is considered in conjunction with the following drawings, in which.

3

Figure 1:
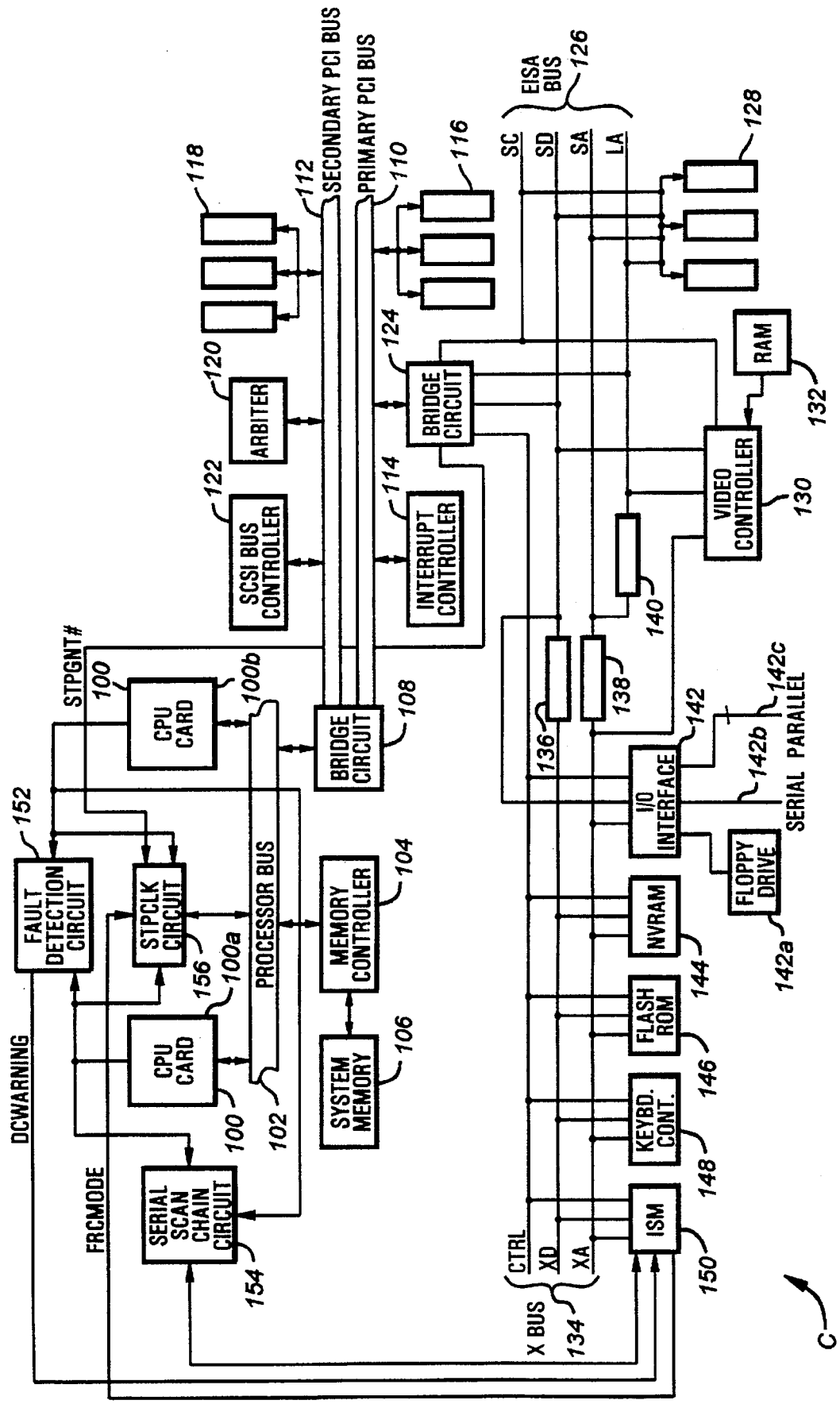
FIG. 1 is a block diagram of a computer system incorporating the present invention.
Figure 9:
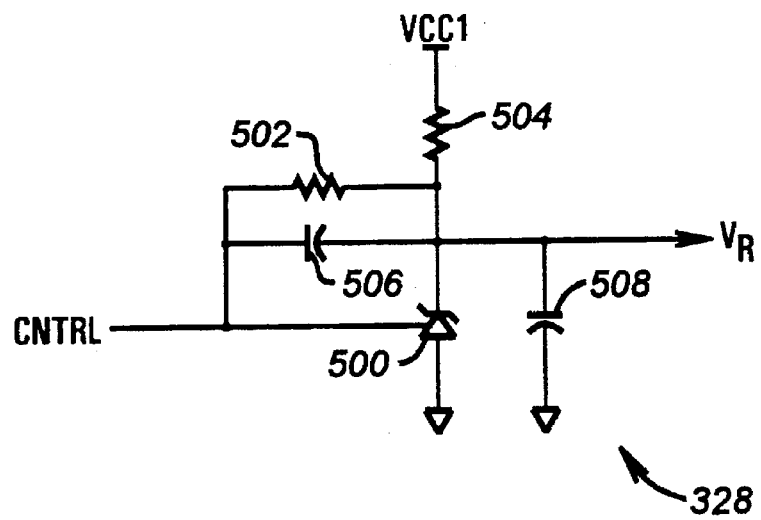
Figure 5:
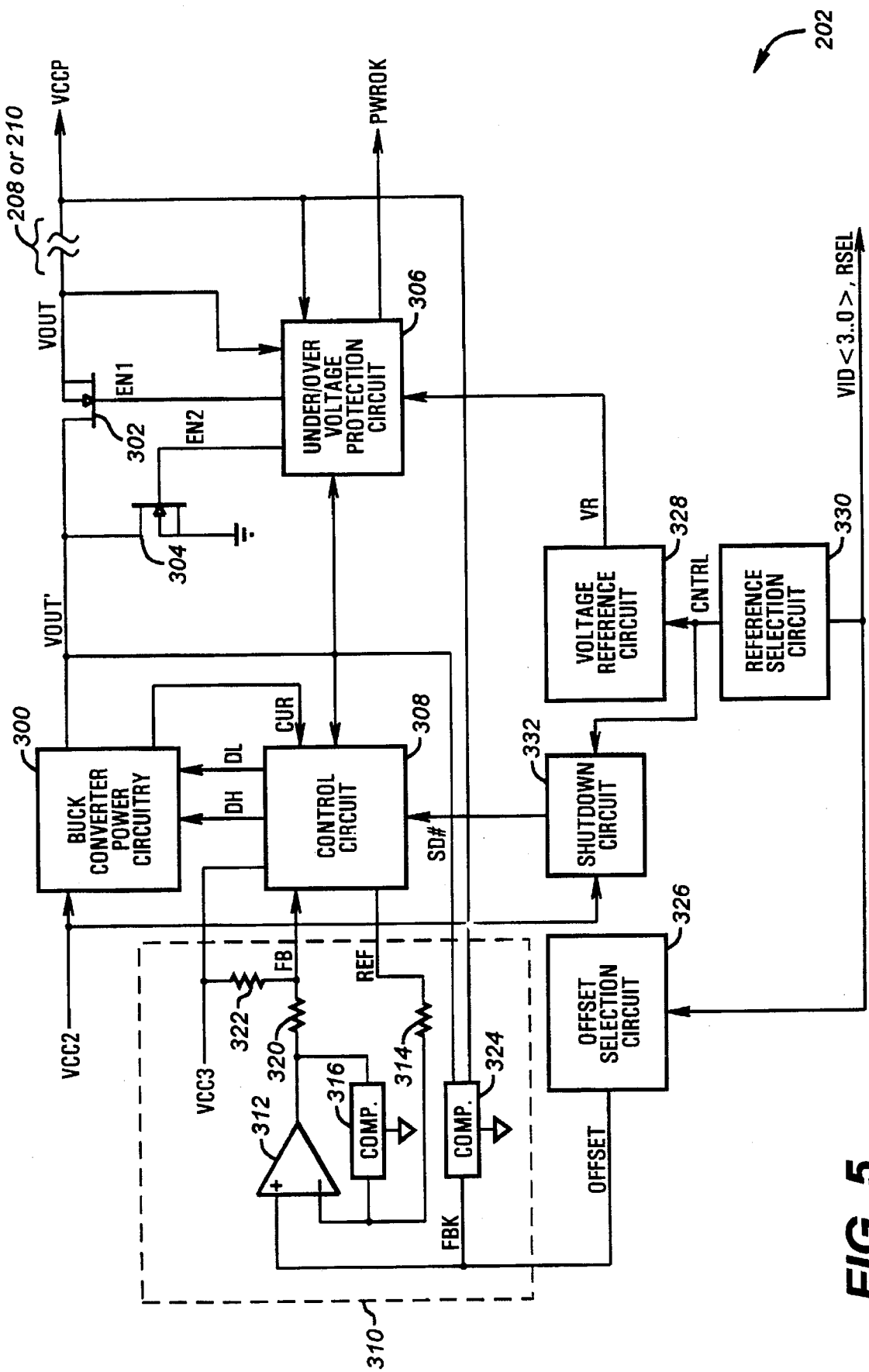
FIG. 5 is a block diagram illustrating the design and operation of the DC-DC converters of FIG. 2.
Figure 10:
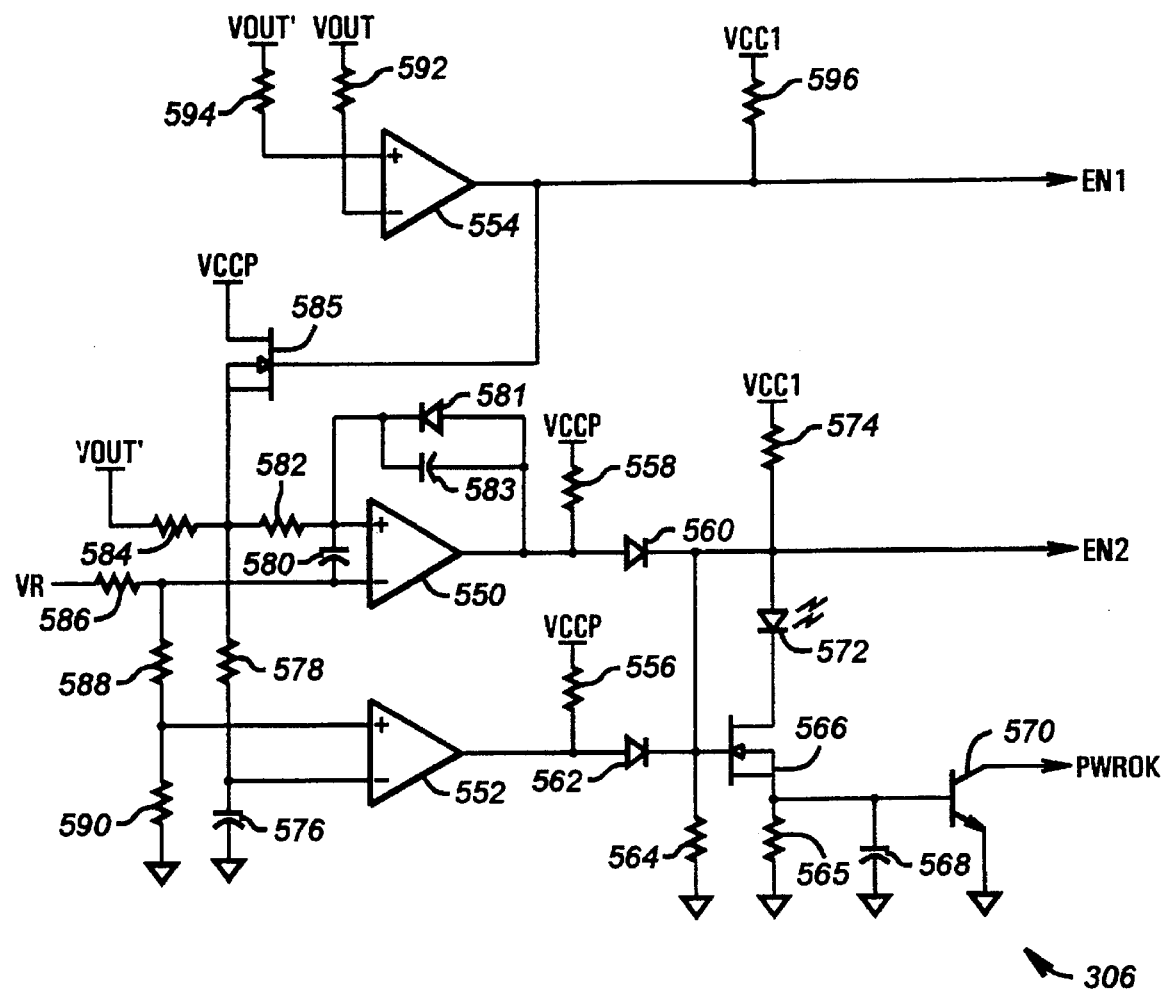
Figure 11:
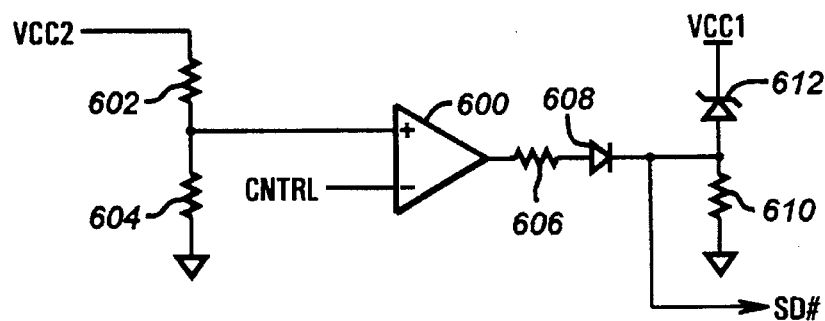
Figure 12:
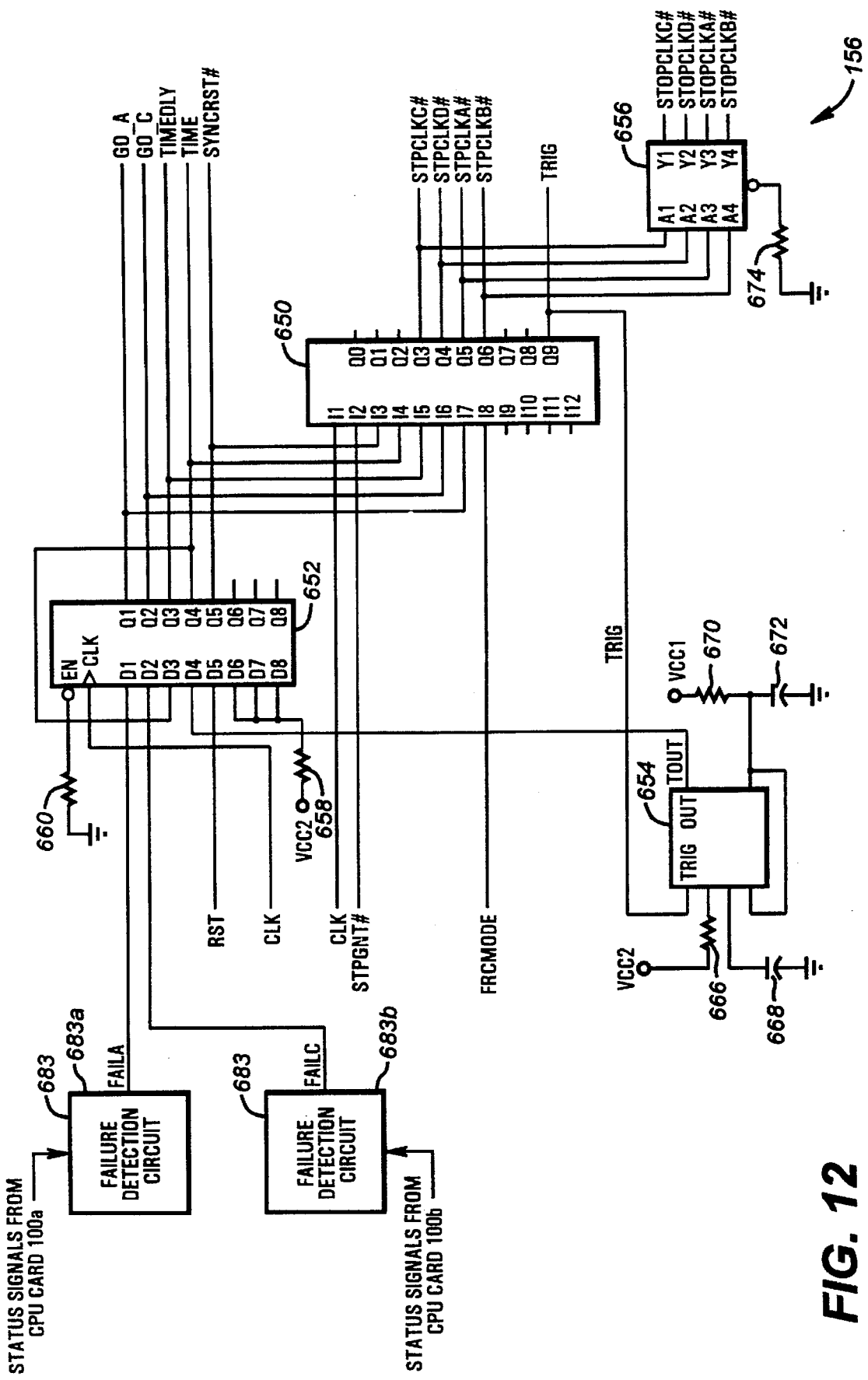
Figure 13:
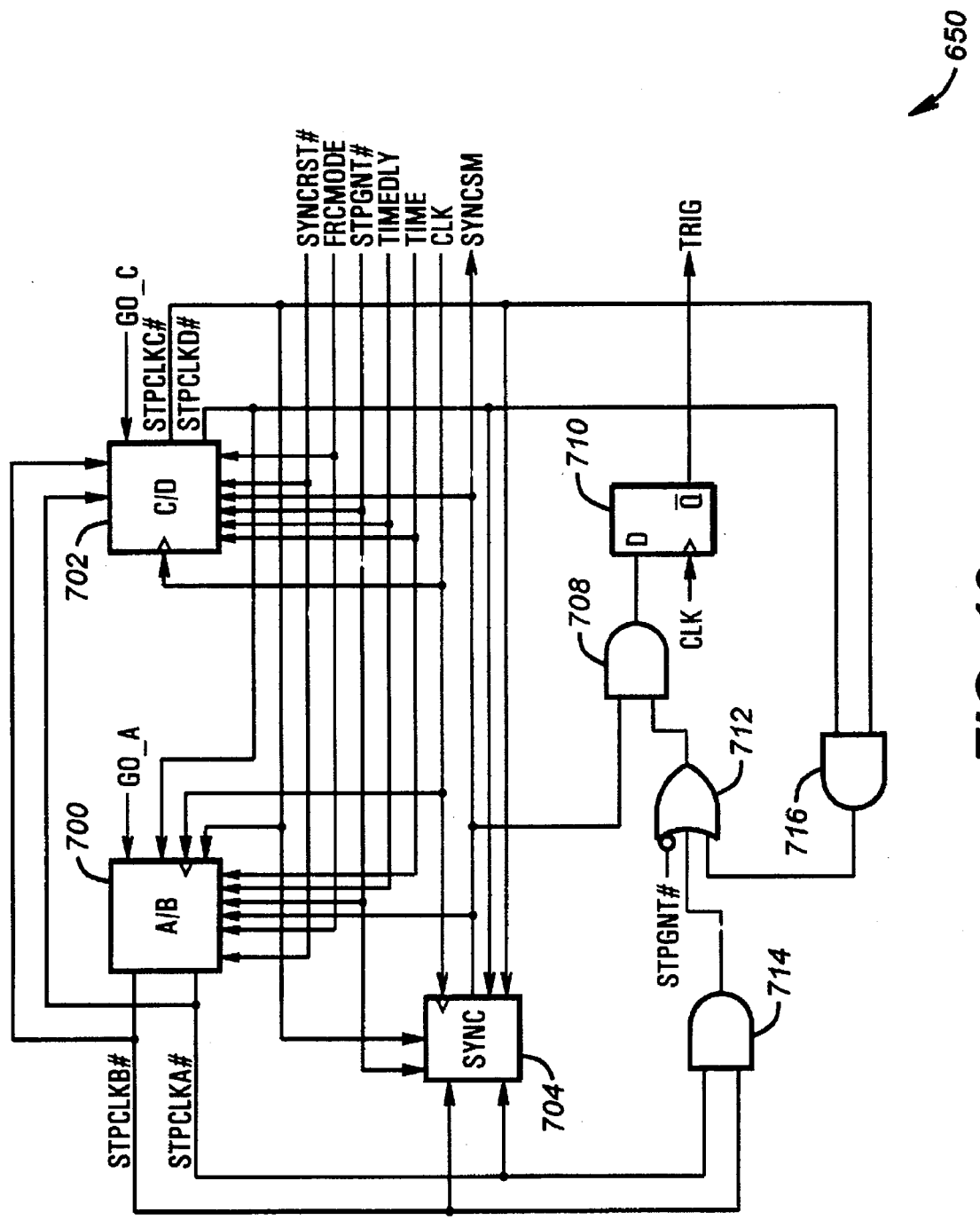
Figure 14:
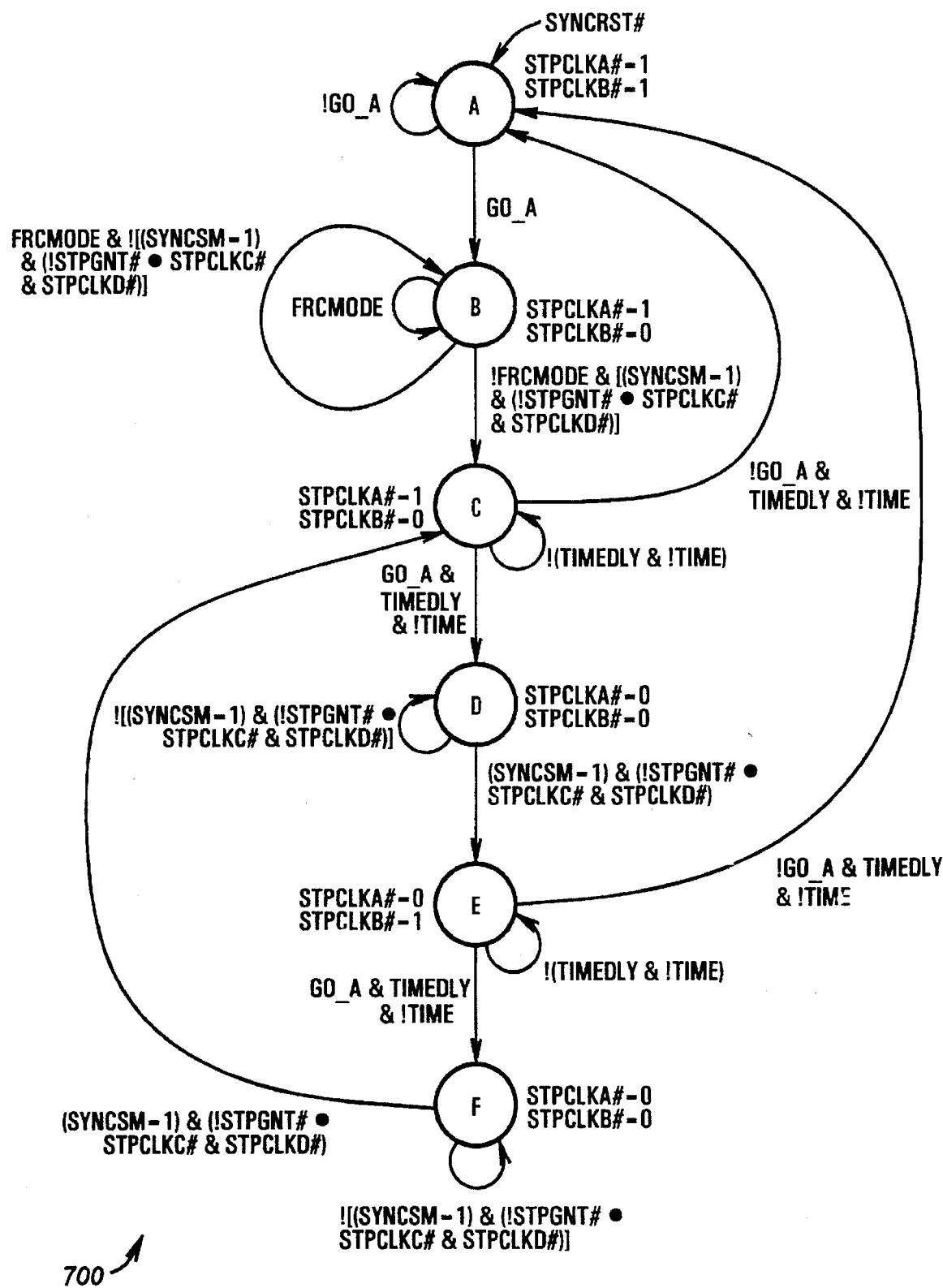
Figure 15:
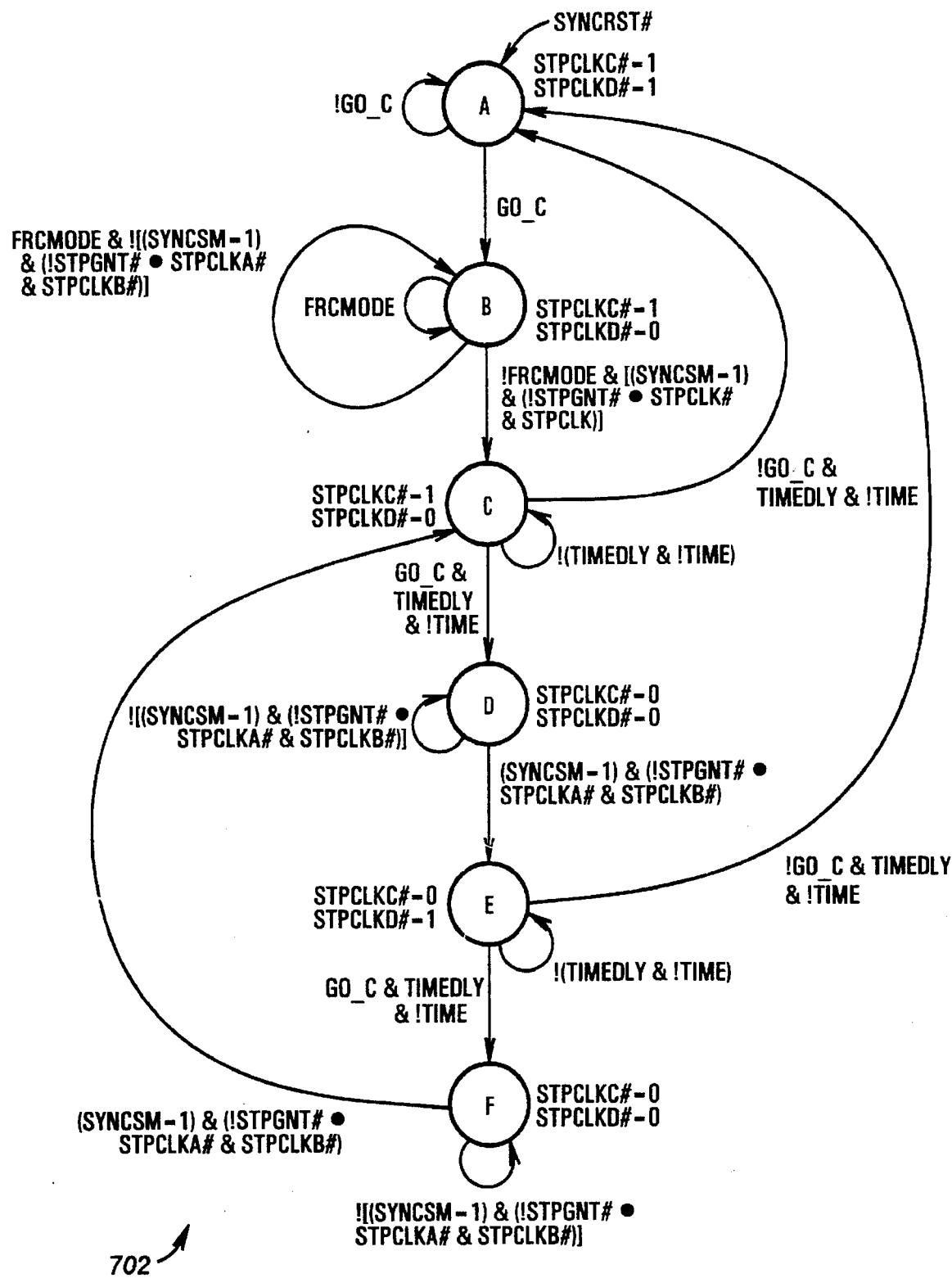
Figure 16:
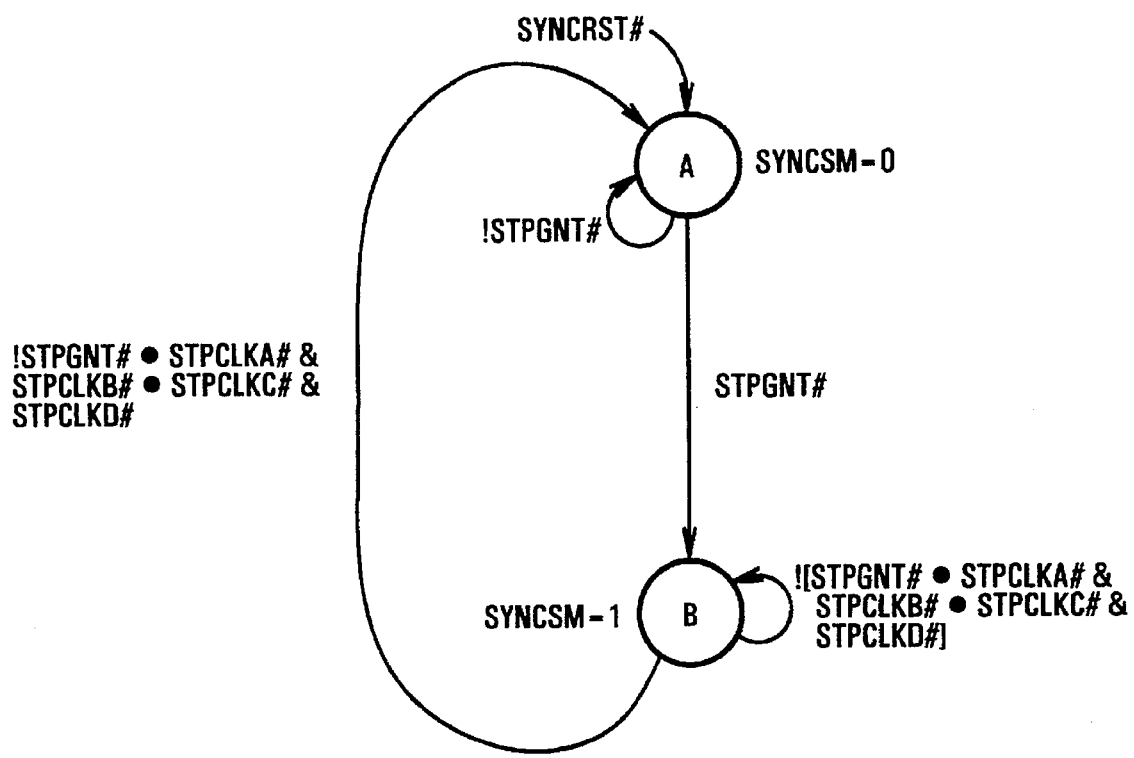
Figure 17:
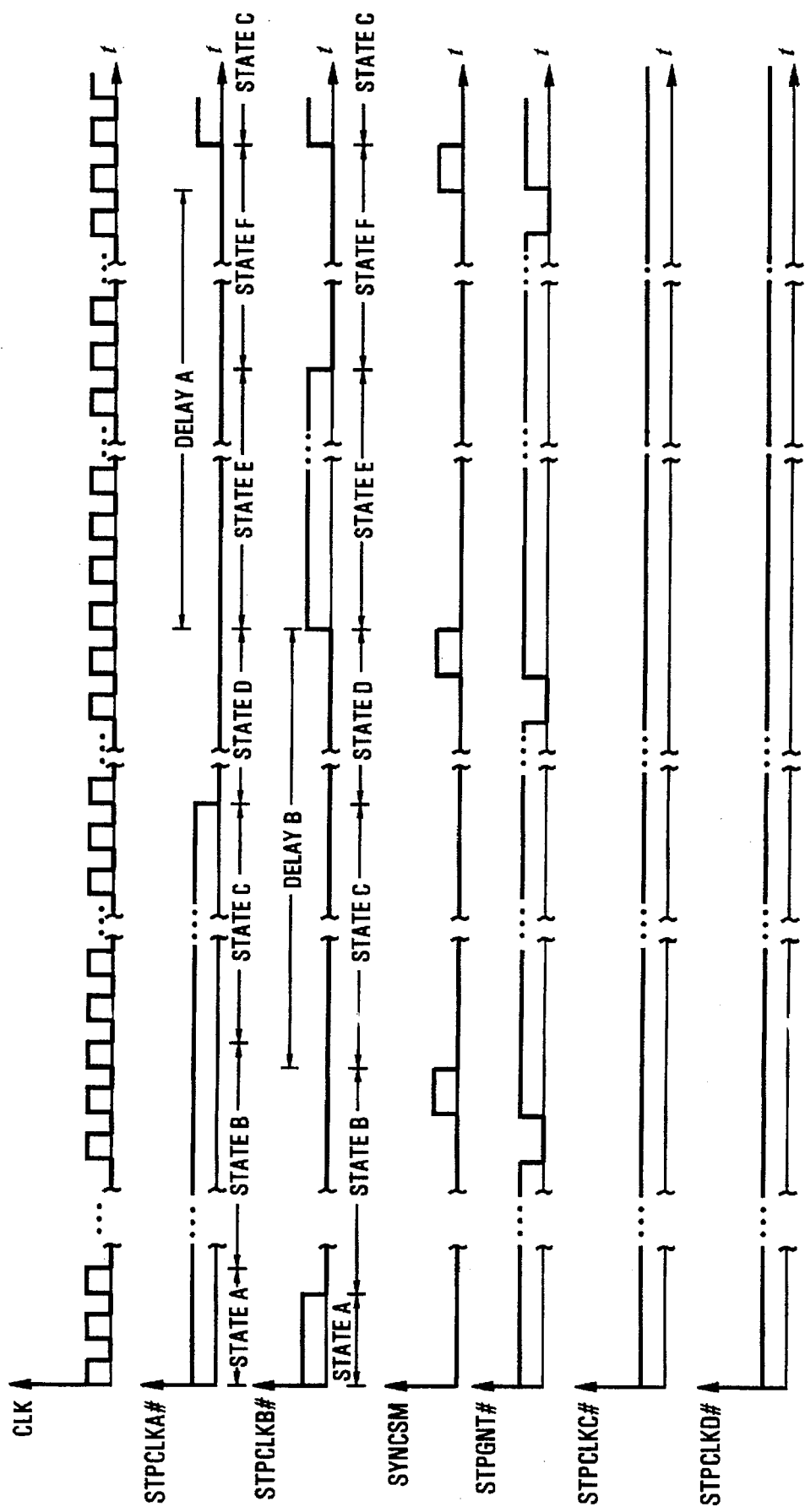
Figure 18:
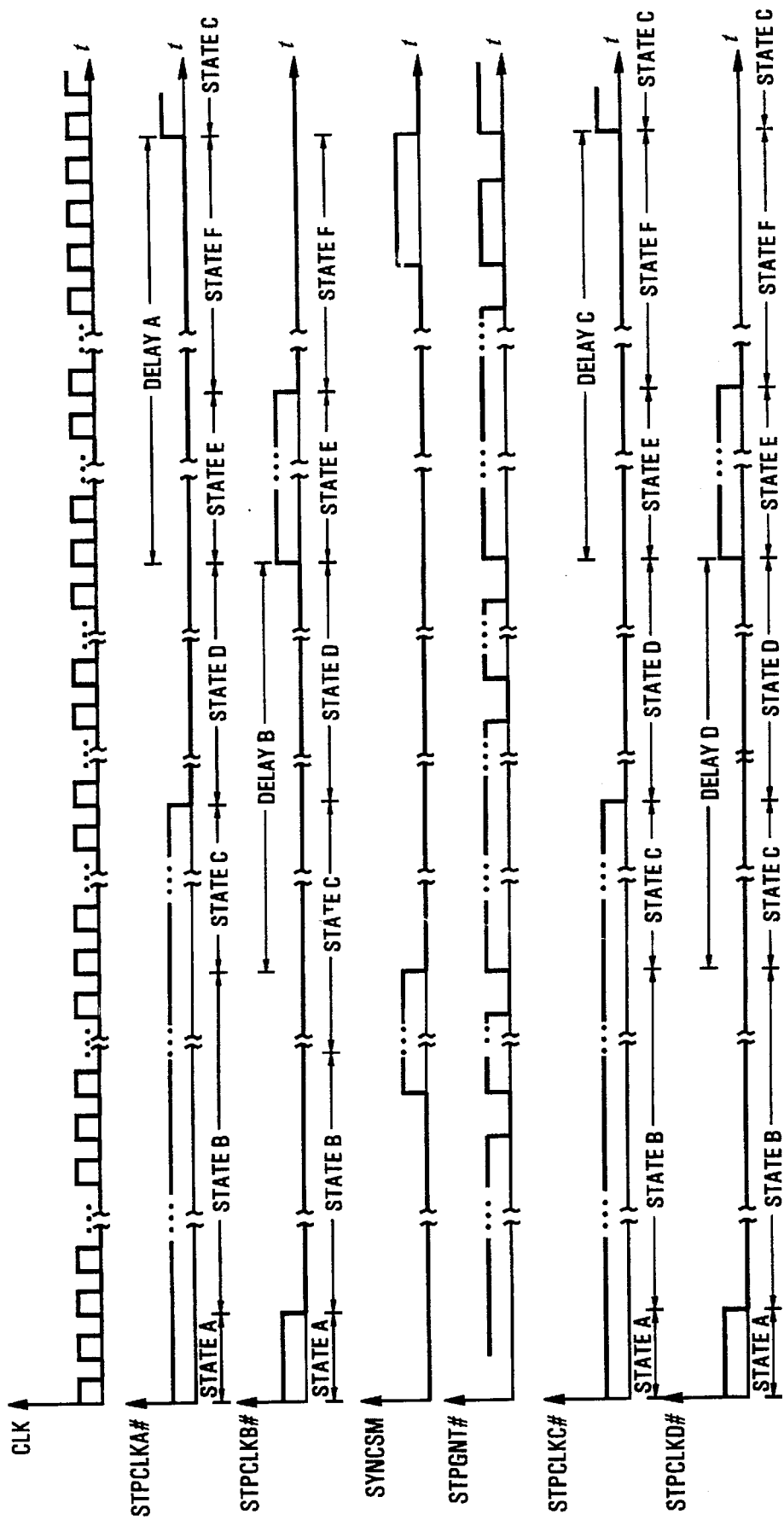
Figure 19:
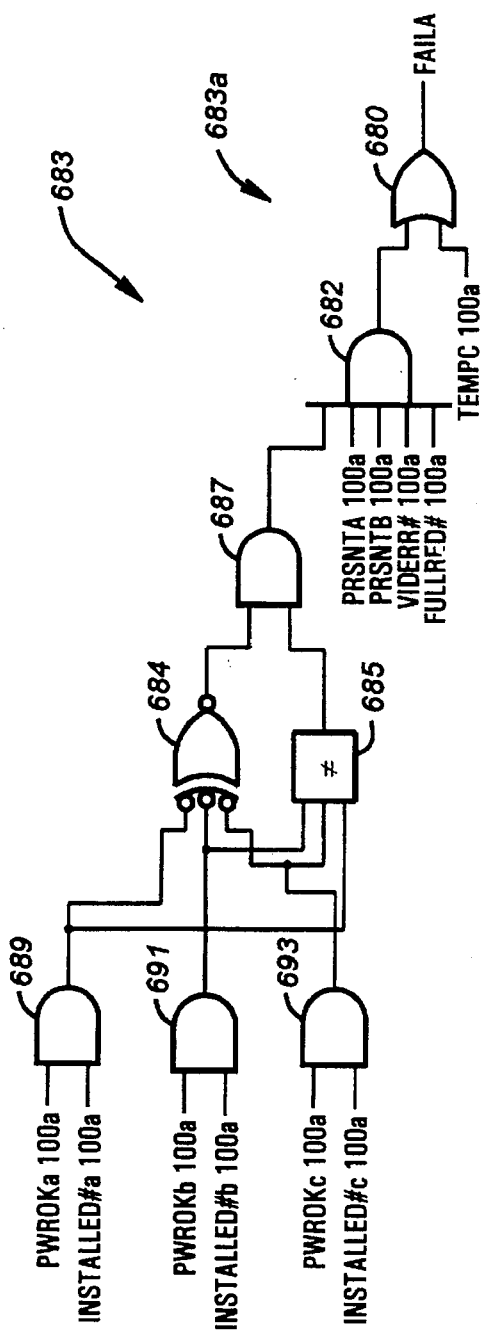
Figure 20:
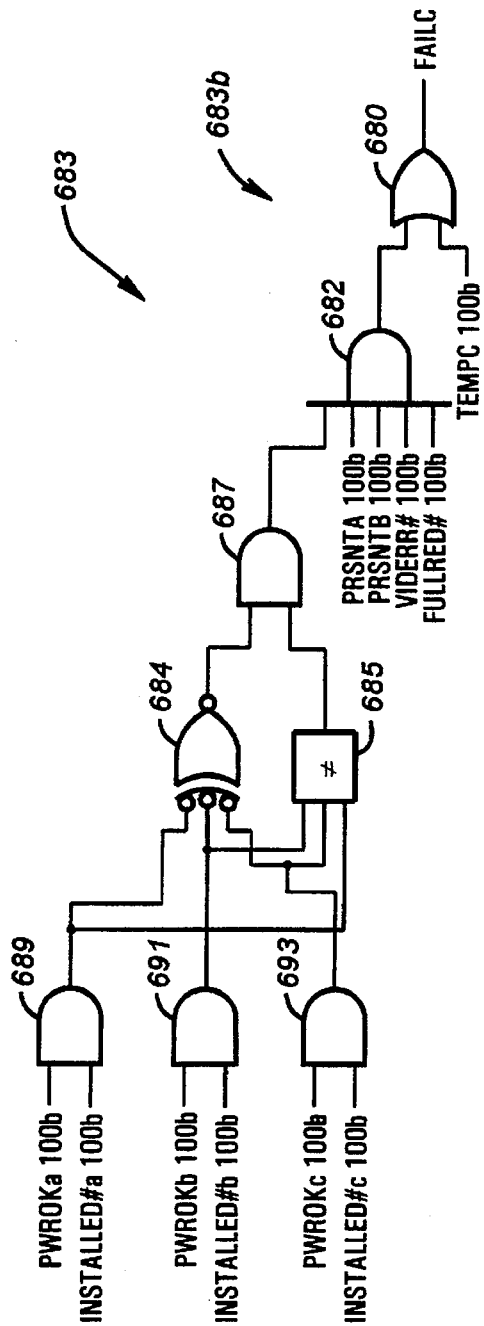

FIG. 9 is a schematic diagram illustrating the design and operation of the voltage reference circuit of FIG. 5;

FIG. 10 is a schematic diagram illustrating the design and operation of the under/over voltage protection circuit of FIG. 5;

FIG. 11 is a schematic diagram illustrating the design and operation of the shutdown circuitry of FIG. 5;

FIG. 12 is a block diagram illustrating the design and operation of the stopclock toggle circuit of FIG. 1;

FIG. 13 is a block diagram illustrating the design and operation of the stopclock circuit of FIG. 12;

FIG. 14 is a state diagram illustrating operation of the A/B state machine of FIG. 13;

FIG. 15 is a state diagram illustrating the operation of the C/D state machine of FIG. 13;

FIG. 16 is a state diagram illustrating the operation of the synchronization state machine of FIG. 13;

FIG. 17 is a timing diagram illustrating operation of the stopclock toggle circuit when two CPUs on one CPU card require power from one DC-DC converter;

FIG. 18 is a timing diagram illustrating operation of the stopclock toggle circuit when two CPUs on both CPU cards require power from one DC-DC converter located on each CPU card; and FIGS. 19 and 20 are schematic diagrams illustrating the design and operation of the failure detection circuits of the stopclock toggle circuit.

DETAILED DESCRIPTION OF PREFERRED EMBODIMENT

1. Overview of the Computer System

Figure 2:
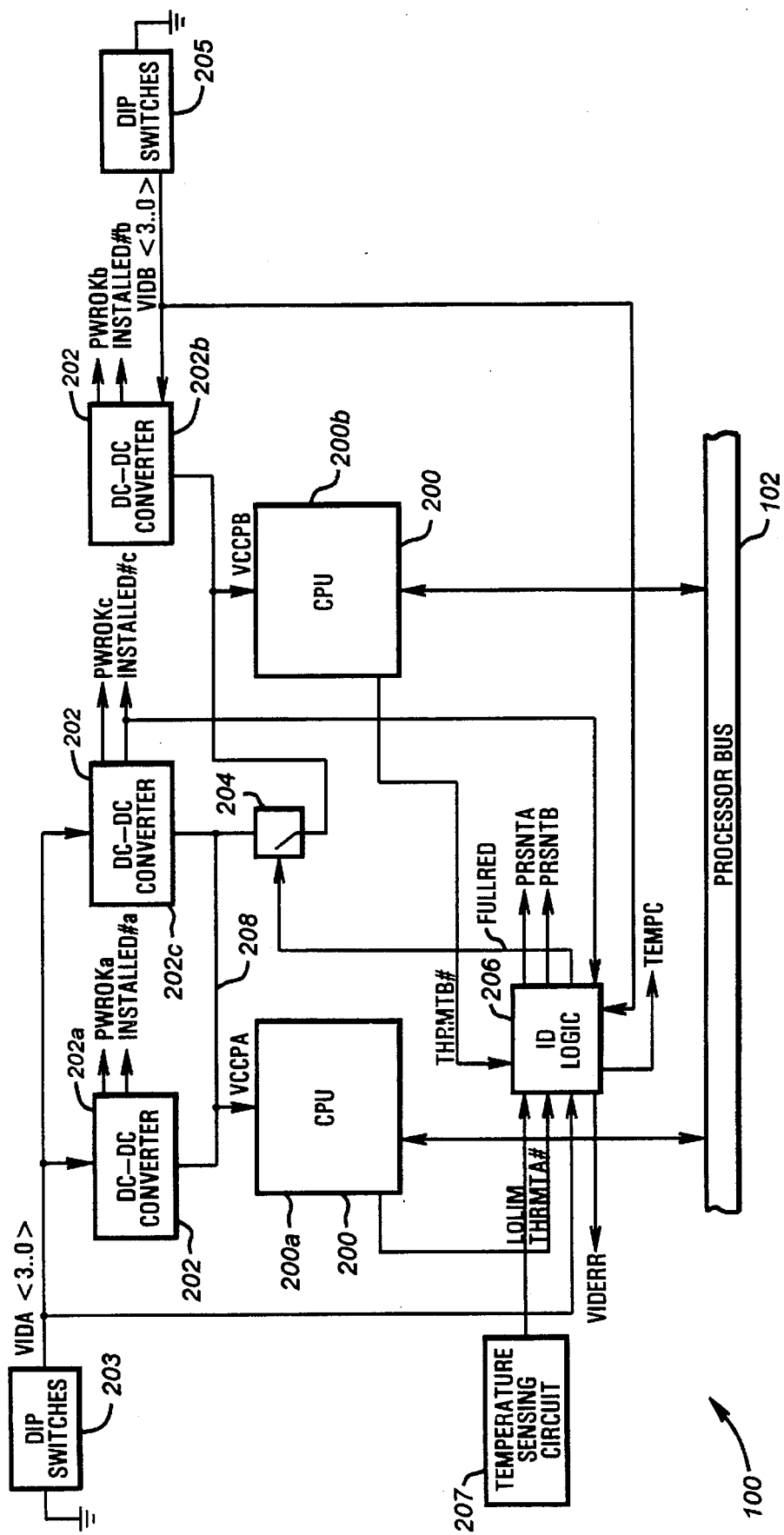
FIG. 2 is a block diagram illustrating the design and operation of the power system of the CPU cards of FIG. 1.

Shown in FIG. 1 is a block diagram illustrating a computer system C incorporating the present invention. The computer system C includes two central processing unit (CPU) cards 100a and 100b, of common design 100. The computer system C resides on an input/output (I/O) board of a local area network (LAN) server. As explained further below, each CPU card 100 includes two CPUs 200 (FIG. 2). The CPU cards 100a and 100b are both coupled to a processor bus 102.

Also coupled to the processor bus 102 is a memory controller 104 and a bridge circuit 108. The memory controller 104 interfaces the processor bus 102 to a system memory 106. The bridge circuit 108 interfaces the processor bus 102 to a primary Peripheral Component Interconnect (PCI) bus 110 and a secondary PCI bus 112.

Also coupled to the processor bus 102 is a stopclock toggle circuit 156. As explained more fully below, the stopclock toggle circuit 156 places CPUs 200 on the CPU cards 100 in alternative known stopclock modes under certain power failure or over temperature conditions. In the stopclock mode, the CPUs 200 consume considerably less power than when in their normal mode of operation.

The stopclock toggle circuit 156 receives a functional redundancy check mode signal, FRCMODE, which indicates whether the two CPU cards 100, each functioning as a logical unit, are operating in a functional redundancy check mode. This occurs when one CPU card 100 is acting as a master, and the other CPU card 100 is functioning as a slave. Typically, the CPU card 100 functioning as a slave is performing error checks on the operations performed by the CPU card 100 functioning as a master.

The stopclock toggle circuit 156 also receives a stopclock mode grant signal STPGNT#, where the "#" suffix indicates

4 negative logic. The assertion of the STPGNT# signal indicates acknowledgement by one of the CPUs 200 that the CPU 200 has entered the known stopclock mode. In order to place the CPU 200 in the stopclock mode, the stopclock toggle circuit 156 sends a stopclock mode request to the CPU 200, as further explained below.

Additionally, the stopclock toggle circuit 156 receives information from the CPU cards 100 relating to power configuration status and temperature status of the CPU cards 100.

Signals indicative of the power configuration, power status and temperature conditions of the CPU cards 100 are provided by the CPU cards 100 to a serial scan chain circuit 154 and a fault detection circuit 152. The serial scan chain circuit 154 receives various computer system C status signals. The serial scan chain circuit 154 is used by the computer system C to log the failure status of DC-DC converters 202 (FIG. 2) onboard the CPU cards 100, as further explained below. The fault detection circuit 152 provides a DCWARNING signal which is asserted when a DC-DC converter 202 fails and negated otherwise.

Coupled to the secondary PCI bus 112 is a SCSI bus controller 122, an arbiter 120 and PCI slots 118. Coupled to the primary PCI bus 110 is an interrupt controller 114, a bridge circuit 124 and PCI slots 116. The bridge circuit 124 interfaces the primary PCI bus 110 to an Extended Industry Standard Architecture (EISA) bus 126.

The bridge circuit 124 also provides the STPGNT# signal to the stopclock toggle circuit 156. The bridge circuit 124 asserts the STPGNT# signal for one PCI clock cycle upon recognition of a PCI stop grant cycle which is driven by one of the CPUs 200. The STPGNT# signal is deasserted otherwise. The bridge circuit 124 includes an 82374 EISA system component (ESC) circuit and an 82375 PCI-EISA bridge (PCEB) circuit which generates the STPGNT# signal. The ESC circuit and the PCEB circuit are a PCI-EISA bridge chip set manufactured by Intel.

The EISA bus 126 includes a buffer circuit 136, a buffer circuit 138, and a latch buffer circuit 140 for transforming the data and address lines of the EISA bus 126 to data and address lines of an X bus 134. The X bus 134 is a secondary data bus buffered from the EISA bus 126 which is used to interface with peripheral devices that do not require a high speed interface.

The buffer circuit 136 couples data lines SD of the EISA bus 126 to data lines XD of the X bus 134. The buffer circuit 138 couples address lines SA of the EISA bus 126 to address lines XA of the X bus 134. The latch buffer circuit 140 forms latched address lines LA of the EISA bus 126 from the address lines SA of the EISA bus 126.

EISA bus slots 128 and a video controller 130 with associated RAM 132 are coupled to the EISA bus 126. The video controller 130 is further coupled to the address lines XA lines of the X bus 134. An I/O interface 142 is also coupled to the X bus 134. The I/O interface 142 provides connections for a floppy drive 142a, serial ports 142b and parallel ports 142c. Also coupled to the X bus 134 is a non-volatile random access memory (NVRAM) 144, a flash read only memory (ROM) 146, a keyboard controller 148 and an integrated system management (ISM) circuit 150.

The ISM circuit 150 receives the DCWARNING signal from the fault detection circuit 152 and furnishes the FRCMODE signal to the stopclock toggle circuit 156. Through the serial scan chain circuit 154, the ISM circuit 150 receives status signals from the CPU cards 100 indicating whether the CPU cards 100 are operating in the functional redundancy check mode. The ISM circuit 150 also receives DC-DC converter 202 status signals from the serial scan chain circuit 154, as described below.

The computer system C alerts the operator of the LAN when one of the DC-DC converters 202 fails. The status signals of the DC-DC converters 202 on the CPU cards 100 are provided to the fault detection circuit 152. When the fault detection circuit 152 determines that one of the DC-DC converters 202 has failed, the fault detection circuit 152 asserts the DCWARNING signal.

In response to the assertion of the DCWARNING signal, the ISM circuit 150 generates an interrupt request signal which alerts the operating system (OS) to check the status signals provided by the serial scan chain circuit 154 in order to determine which one of the DC-DC converters 202 has failed. Upon this occurrence, the ISM 150 initiates a serial transfer from the serial scan chain circuit 154 to the ISM circuit 150 where the status signals are serially provided to the ISM circuit 150. The status signals can then be read from the ISM circuit 150 through the X bus 134.

Therefore, the particular DC-DC converter 202 that failed on the CPU card 100 can be identified, and the status of the particular CPU card 100 can then be evaluated. The above-described fault detection system reports errors to the user of the LAN. A more detailed discussion of the serial scan chain circuit 154 can be found in U.S. Pat. No. 5,287,531, entitled, "Apparatus For System Configuration Determination," granted Feb. 15, 1994, which is hereby incorporated by reference. The present invention, as explained further below, does not require user intervention. Thus, no further description of the above-described fault detection system is necessary to gain a full understanding of the present invention.

The computer system C furnishes two supply voltage levels, represented by VCC1 and VCC2 (not shown in FIG. 1), to the CPU cards 100. In the described embodiment, VCC1 is equal to 12 volts, and VCC2 is equal to 5 volts. As explained more fully below, each DC-DC converter 202 receives the VCC2 voltage level and converts this voltage level into an appropriate voltage level for the CPU 200 being powered by the DC-DC converter 202.

2. Overview of the Power System for the CPU Cards

Shown in FIG. 2 is a schematic diagram illustrating the power system for the CPU cards 100. As previously mentioned, both the CPU cards 100a and 100b are of common design 100.

The CPU card 100 includes a CPU 200a and a CPU 200b, both of common design 200. The CPU 200a receives a supply voltage level VCCPA at its supply voltage input, and the CPU 200b receives a supply voltage level VCCPB at its supply voltage input. The CPUs 200 in the described embodiment are Pentium Pro processors manufactured by Intel. Both the supply voltage levels VCCPA and VCCPB are specified by the manufacturer for each individual unit. The manufacturer also specifies a four bit voltage identification signal VIDA<3..0> and a four bit voltage identification signal VIDB<3..0> which are indicative of the VCCPA and the VCCPB voltage levels, respectively.

The VCCPA voltage level is provided by a power plane 208 which is coupled to the output of a DC-DC converter 202a and the output of an optional DC-DC converter 202c. Both of the DC-DC converters 202a and 202c are of common design 202. Signals provided to and furnished by the DC-DC converters 202a and 202c are referenced by the suffixes "a" and "c," respectively.

The DC-DC converters 202a and 202c have selectable voltage output levels which are selected by the voltage identification signal VIDA<3..0>. The VIDA<3..0> signal is provided to the voltage selection inputs of both the DC-DC converter 202a and the DC-DC converter 202c. The logic level of bits of the VIDA<3..0> signal are set by dual in-line pin (DIP) switches 203. If not coupled to ground by the DIP switches 203, the logic level of the bits of the VIDA<3..0> signal, in the described embodiment, are pulled high by the CPU 200a if not negated by the DIP switches 203. In an alternative embodiment, the CPU 200a programs the VIDA<3..0> signal, and the DIP switches 203 are not implemented.

A DC-DC converter 202b, of common design 202, provides power to the CPU 200b through a power plane 210 to which the output of the DC-DC converter 202b is coupled thereto. Signals provided to and furnished by the DC-DC converter 202b are referenced by the suffix "b." The CPU 200b receives at its voltage supply input the voltage level represented by VCCPB. The DC-DC converter 202b receives the voltage identification signal VIDB<3..0> at its voltage selection input.

As in the other DC-DC converters 202, the voltage identification signal VIDB<3..0> selects the voltage level VCCPB provided by the DC-DC converter 202b to the CPU 200b. The logic level of the bits of the voltage identification signal VIDB<3..0> are selected by DIP switches 205 similar to the selection of the bits of the VIDA<3..0> signal. The CPU 200b pulls the logic level of the bits of the VIDB<3..0> signal high if not negated by the DIP switches 205. In an alternative embodiment, the CPU 200b programs the VIDB<3..0> signal, and the DIP switches 205 are not implemented.

Thus, the DC-DC converters 202a and 202c furnish power to the CPU 200a, and the DC-DC converter 202b furnishes power to the CPU 200b. If the voltage identification signal VIDA<3..0> is equal to the voltage identification signal VIDB<3..0>, the same voltage level exists on both power planes 208 and 210. When this occurs, a switch circuit 204 couples the power planes 208 and 210 together.

Circuitry is provided in order to determine if the voltage identification signals VIDA<3..0> and VIDB<3..0> are equal. An identification logic circuit 206 receives the VIDA<3..0> and VIDB<3..0> signals and provides a full redundancy signal FULLRED for activating the switch circuit 204. The switch circuit 204 has an equivalent series switched path coupled between the power planes 208 and 210. The switch circuit 204 closes its series switched path when the FULLRED signal is asserted. The power planes 208 and 210 are electrically isolated when the FULLRED signal is negated.

A voltage identification error signal VIDERR# is also furnished by the identification logic circuit 206. The VIDERR# signal indicates the result of the comparison of the voltage identification signals VIDA<3..0> and VIDB<3..0>. When these signals are unequal, the VIDERR signal is asserted, and when these signals are equal, the VIDERR signal is negated.

The identification logic 206 further receives a temperature warning signal THRMBTB# from the CPU 200b which, when asserted, indicates that the ambient temperature of the CPU 200b has exceeded a predetermined CPU maximum temperature. The identification logic 206 further receives a THRMTA# signal from the CPU 200a which, when asserted, indicates that the ambient temperature of the CPU 200a has exceeded the predetermined CPU maximum temperature.

The identification logic 206 also receives a LOLIM signal from a conventional temperature sensing circuit 207 located on the CPU card 100. When the LOLIM signal is asserted, this indicates the ambient temperature of the CPU card 100 has exceeded a card predetermined maximum temperature. The identification logic 206 furnishes a TEMPC signal, which, when asserted, indicates an over temperature condition on the CPU card 100.

Each of the DC-DC converters 202 provides a PWROK signal which is indicative of the power status of the DC-DC converter 202. When the PWROK signal is asserted, the DC-DC converter 202 is functioning properly. When the PWROK signal is negated, the DC-DC converter 202 has failed.

When the DC-DC converter 202 is installed on the CPU card 100, the DC-DC converter 202 negates an INSTALLED# signal. The INSTALLED# signal indicates whether the DC-DC converter 202 has been installed. The INSTALLED# signal is normally pulled high by a resistor coupled to a positive voltage level (not shown). When the INSTALLED# signal is asserted, the DC-DC converter 202 has been installed, and when deasserted, the DC-DC converter 202 has not been installed.

The identification logic 206 also furnishes a PRSNTA signal and a PRSNTB signal. The assertion of the PRSNTA signal indicates the CPU 200a is installed, and the negation of the PRSNTA signal indicates the CPU 200a is not installed. Similarly, the assertion of the PRSNTB signal indicates the CPU 200b is installed, and the negation of the PRSNTB signal indicates the CPU 200b is not installed.

Other embodiments of the present invention are envisioned. These embodiments might include a plurality of switch circuits 204 and an additional DC-DC converter 202 for each switch circuit 204. The switch circuits 204 in these embodiments could couple a large number of DC-DC converters 202 in parallel if their voltage identification signals are equivalent. This would allow greater redundancy for the computer system C.

In summary, the CPU card 100 includes the DC-DC converters 202a and 202c which furnish power to the CPU 200a and the DC-DC converter 202b which furnishes power to the CPU 200b. If all of the DC converters 202 are providing the same supply voltage level, the identification logic 206 couples the power planes 208 and 210 together through the switch circuit 204. The output voltage levels of the DC-DC converters 202 are selected through the VIDA<3..0> and VIDB<3..0> signals.

3. The Identification Logic

Figure 3:
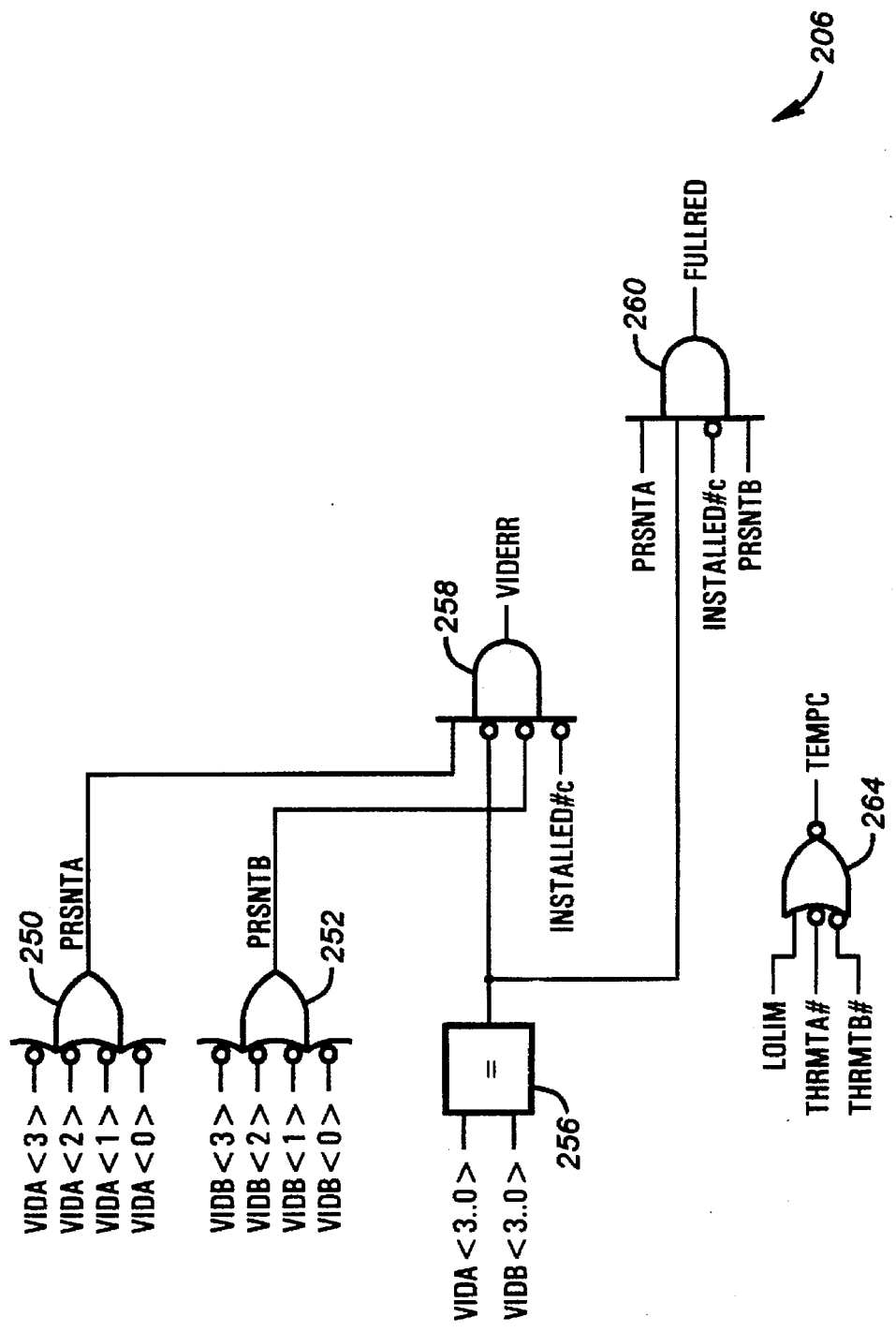
FIG. 3 is a block diagram illustrating the design and operation of the identification logic of FIG. 2.

Shown in FIG. 3 is a schematic diagram illustrating the design and operation of the identification logic 206. A NAND gate 250 receives the bits of the voltage identification signal VIDA<3..0>. If the CPU 200a is not present, the voltage identification signal VIDA<3..0> is equal to "b1111,"0 where the prefix "b" denotes binary representation. The output of the NAND gate 250 provides the PRSNTA signal. When the VIDA<3..0> signal is equal to "b1111," the NAND gate 250 negates the PRSNTA signal. When the CPU 200a is installed, the NAND gate 250 asserts the PRSNTA signal.

Both the PRSNTA and the PRSNTB signals are provided as inputs to an AND gate 258. The AND gate 258 also receives the inverted INSTALLED#c signal and the inverted output of an equal circuit 256. The output of the equal circuit 256 is asserted when its inputs are equal and negated otherwise. The equal circuit 256 receives the VIDA<3..0> and VIDB<3..0> signals.

The AND gate 258 furnishes the VIDERR signal. When both CPUs 200 are installed; the VIDA and VIDB signals are not equal and the DC-DC converter 202c is installed, the VIDERR signal is asserted. The VIDERR signal is otherwise negated.

An AND gate 260 furnishes the FULLRED signal. When both CPUs 200 are installed (PRSNTA and PRSNTB asserted), the DC-DC converter 202c is installed (INSTALLED#c is negated); and the VIDA<3..0> and VIDB<3..0> signals are equivalent, the FULLRED signal is asserted. The FULLRED signal is otherwise negated.

The bits of the voltage identification signal VIDB<3..0> are provided to the inputs of a NAND gate 252. The output of the NAND gate 252 provides the PRSNTB signal. When the voltage identification signal VIDB<3..0> is equal to "b1111," the NAND gate 252 negates the PRSNTB signal. When the voltage identification signal VIDB<3..0> is not equal to "b1111," the NAND gate 252 asserts the PRSNTB signal.

Also shown in FIG. 3 is circuitry to generate the TEMPC signal. An OR gate 264 receives the LOLIM signal, the inverted THRMTA# signal and the inverted THRMTB# signal. The output of the OR gate 264 provides the TEMPC signal.

In summary, the full redundancy signal FULLRED is asserted when certain conditions exist. These conditions are when both of the CPUs 200 are installed; the VIDA<3..0> and VIDB<3..0> signals are equal; and the DC-DC converter 202c is installed. The assertion of the FULLRED signal couples the power planes 208 and 210.

4. The Switch Circuit

Figure 4:
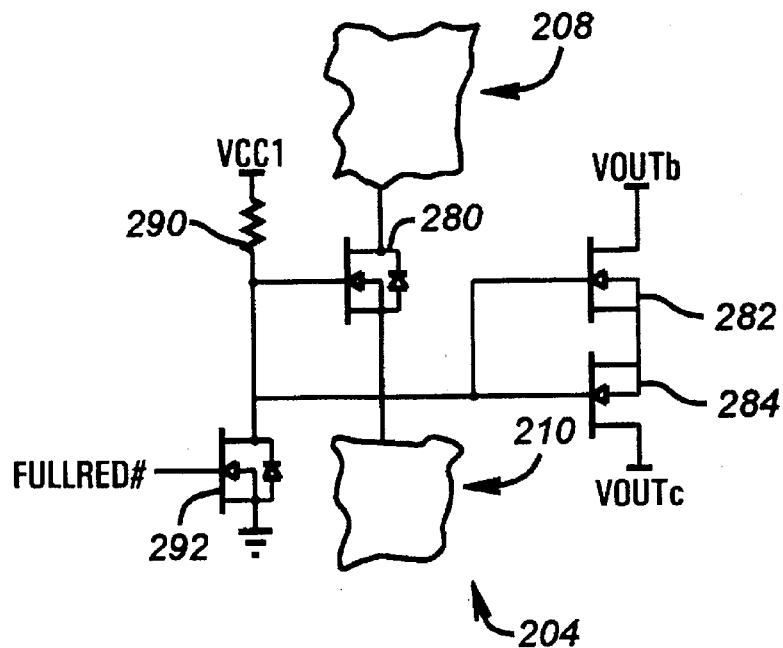
FIG. 4 is a schematic diagram illustrating operation of the design and operation of the switch circuit of FIG. 2.

Shown in FIG. 4 is a schematic diagram illustrating the design and operation of the switch circuit 204. The FULLRED# signal is received by the gate of an N-channel, metal-oxide-semiconductor field-effect-transistor (MOSFET) 292. The source of the transistor 292 is connected to ground, and the drain of the transistor 292 is connected to one end of a resistor 290 which has its other end connected to the voltage level VCC1.

The drain of the transistor 292 is also connected to the gate of an N-channel MOSFET 280. The drain of the transistor 280 is connected to the voltage level VCCPA, and the source of the transistor 280 is connected to the voltage level VCCPB. Thus, when the FULLRED# signal is asserted, the power plane 208 is coupled to the power plane 210 through the transistor 280.

The drain of the transistor 292 is further coupled to the gate of an N-channel MOSFET 282 and the gate of an N-channel MOSFET 284. The source of the transistor 282 is connected to the source of the transistor 284. The drain of the transistor 282 is connected to a voltage level VOUTb provided at the output terminal of the DC-DC converter 202b. The drain of the transistor 284 is connected to a voltage level VOUTc provided at the output terminal of the DC-DC converter 202c. Thus, when the FULLRED# signal is asserted, the VOUTb and VOUTc voltage levels are coupled together through the transistors 282 and 284.

The DC-DC converter 202a furnishes an output voltage level VOUTa at its output terminal. The VOUTa, VOUTb and VOUTc voltage levels are used by the feedback circuitry 310 (FIG. 5) of the DC-DC converters 202, as explained more fully below.

In summary, the assertion of the FULLRED# signal couples the VCCPA and the VCCPB voltage levels through the transistor 280. The assertion of the FULLRED# signal also couples the VOUTb and the VOUTc voltage levels through the transistors 282 and 284.

5. The DC-DC Converter a. Overview

Shown in FIG. 5 is a block diagram illustrating the operation and design of the DC-DC converter 202. The DC-DC converter 202 includes buck converter power circuitry 300 which receives the VCC2 voltage level. The buck converter power circuitry 300 converts the voltage level VCC2 to an output voltage level VOUT' which, in the described embodiment, ranges from 2.1 volts to 3.5 volts.

The VOUT40 voltage level is selected by a four bit voltage identification signal VID<3..0>. The VID<3..0> signal represents either the VIDA<3..0> or the VIDB<3..0> signals. The relationship between the voltage identification signal VID<3..0> and the corresponding voltage level to be furnished to the CPUs 200 is described by the following table:

| Selectable Output Voltages of the DC-DC Converter 202 | |
| --- | --- |
| VID<3..0> (Binary) | VCCPA or VCCPB (Volts) |
| 0000 | 3.5 |
| 0001 | 3.4 |
| 0010 | 3.3 |
| 0011 | 3.2 |
| 0100 | 3.1 |
| 0101 | 3.0 |
| 0110 | 2.9 |
| 0111 | 2.8 |
| 1000 | 2.7 |
| 1001 | 2.6 |
| 1010 | 2.5 |
| 1011 | 2.4 |
| 1100 | 2.3 |
| 1101 | 2.2 |
| 1110 | 2.1 |
| 1111 | CPU Not Installed |

The VOUT' voltage level is provided to the drain of an N-channel MOSFET 302 which is activated by an EN1 signal received at its gate. The source of the transistor 302 provides an output voltage VOUT to either the power plane 208 or 210. The VOUT voltage level represents either the VOUTa, VOUTb or VOUTc voltage levels of the DC-DC converters 202a, 202b and 202c, respectively. When the DC-DC converter 202 is fully powered up and functioning properly, an under/over voltage protection circuit 306 asserts the EN1 signal which allows the DC-DC converter 202 to furnish the VOUT' voltage level to the CPUs 200.

The protection circuit 306 receives a supply voltage level VCCP, the VOUT voltage level and the VOUT' voltage level. VCCP represents either the VCCPA or the VCCPB supply voltage level.

The protection circuit 306 monitors an output voltage level of the DC-DC converter 202 and furnishes the PWROK signal. This monitored output voltage level is either the voltage level VOUT' or the supply voltage level VCCP. As described further below, when the DC-DC converter 202 is first powered up, the protection circuit 306 monitors the voltage level VOUT' to ensure the DC-DC converter 202 is functioning properly.

Once the DC-DC converter 202 is fully powered up, the EN1 signal is asserted and the transistor 302 conducts. When this occurs, the voltage level VOUT' is furnished to the CPU 200. The protection circuit 306 then monitors the VCCP voltage level. The term "output voltage level" of the DC-DC converter 202 refers to either the VCCP or the VOUT' voltage level. Specific references are made to the VCCP and VOUT' voltage levels where necessary for clarity of discussion.

The voltage protection circuit 306 also provides a control signal EN2 to the gate of an N-channel MOSFET 304. The drain of the transistor 304 is connected to the VOUT' voltage level, and the source of the transistor 304 is coupled to the power plane ground. When the output voltage of the buck converter power circuitry 300 either drops below a minimum output voltage level or rises above a maximum output voltage level, the protection circuit 306 asserts the EN2 signal. When the EN2 signal is asserted, the transistor 304 conducts which pulls the VOUT' voltage level to the power plane ground.

A control circuit 308, which receives the VOUT' voltage level, senses when the VOUT' voltage level is grounded and shuts down the power circuitry 300 accordingly. The control circuit 308 supplies a control signal DH and a control signal DL to the power circuitry 300, as further explained below.

In the described embodiment, the control circuit 308 is a step-down controller manufactured by Maxim, part no. MAX797. The control signals DH and DL are conventional complementary switching converter control signals. The control signal DH is used to control the switching of a main buck transistor 350 (FIG. 6) in the power circuitry 300. The control signal DL is complementary to the DH signal and is used to control the switching of an N-channel synchronous-rectifier MOSFET 366 (FIG. 6) used in place of a conventional rectifier in the buck converter power circuitry 300.

The control circuit 308 senses the output current of the DC-DC converter 202 through a CUR signal and the VOUT' voltage level. The control circuit 308 is configured to operate as a constant-frequency pulse width modulated (PWM) direct-duty ratio controller. The control circuit 308 is configured to ensure the DC-DC converter 202 operates in a continuous mode of operation even at no load. The control circuit 308 receives a feedback signal FB.

The control circuit 308 also provides a reference voltage level REF and receives a shutdown signal SD# from a shutdown circuit 332. When the shutdown circuit 332 asserts the SD# signal, the control circuit 308 shuts down the DC-DC converter 202. When the SD# signal is deasserted, the control circuit 308 is operational.

The shutdown circuit 332 compares a voltage proportional to the voltage level VCC2 with the voltage level furnished by an output terminal CNTRL of a reference selection circuit 330. The shutdown circuit 332 uses the result of this comparison for determining whether the DC-DC converter 202 should be shut down. This occurs when the VID<3..0> signal is equal to "b1111," which indicates no CPU 200 is present for the DC-DC converter 202 to power. When this occurs, the voltage level of the CNTRL terminal rises above a predetermined voltage level. When the voltage level of the CNTRL terminal reaches this level, the shutdown circuit 332 asserts the SD# signal which shuts down the control circuit 308 and the DC-DC converter 202.

As discussed above, the reference selection circuit 330 furnishes the voltage level of the CNTRL terminal. The reference selection circuit 330 receives the voltage identification signal VID<3..0> and a range select signal RSEL. The range select signal RSEL could be used to define an alternative set of voltage ranges; however, this feature is not used in the described embodiment as the RSEL signal is always grounded.

A voltage reference circuit 328 is also connected to the CNTRL terminal. The output resistance and voltage level of the reference selection circuit 330 selects a voltage reference level VR furnished by the reference circuit 328. This output resistance and voltage of the reference selection circuit 330 is established by the VID<3..0> signal, as further explained below with the discussion of FIG. 8.

The voltage reference circuit 328 functions as a linear voltage regulator which furnishes the VR voltage level to the voltage protection circuit 306. The voltage protection circuit 306 uses the VR voltage level to determine whether the output voltage of the DC-DC converter 202 is above a maximum output voltage level or below a minimum output voltage level. The combination of the reference selection circuit 330 and the voltage reference circuit 328 adjusts the reference voltage level VR according to the desired output voltage level of the DC-DC converter 202 as indicated by the voltage identification signal VID<3..0>.

The control circuit 308, without external circuitry, is designed to provide an output voltage level for the power circuitry 300 in a range from 2.5 volts to 6 volts. As noted above, the output voltage level in the described embodiment has a range from 2.1 to 3.5 volts. Furthermore, because the output voltage level of the DC-DC converter 202 is adjustable in 0.1 volt increments, a tight tolerance is required.

The feedback circuit 310 is designed to accommodate this low voltage range and the tight tolerance. The feedback circuit 310 receives a feedback signal FBK from a frequency compensation circuit 324, the REF voltage level, and a voltage level from an output terminal OFFSET of an offset selection circuit 326. From this information, the feedback circuit 310 furnishes the feedback signal FB.

The voltage level of the OFFSET terminal is a function of the VID<3..0> signal which the offset selection circuit 326 receives. The OFFSET terminal is used to add an offset bias voltage level to the feedback voltage signal FBK furnished by the compensation circuit 324. This is done in order that the output voltage level of the DC-DC converter 202 appears to be higher than actual to the control circuit 308. Thus, the control circuit 308 can control the output voltage level of the DC-DC converter 202 at levels below 2.5 volts.

The feedback circuit 310 includes an error amplifier 312. The amplifier 312 has its output connected to one end of a resistor 320 and to a compensation network 316. The compensation network 316 is also connected to the inverting input of the amplifier 312, and the compensation network 316 is further coupled to a feedback ground. The feedback ground is coupled to the power plane ground near the voltage supply input of either the CPU 200a or 200b.

The inverting input of the amplifier 312 is also connected to one end of a resistor 314 which has its other end connected to the reference voltage level REF. The other end of the resistor 320 provides the feedback signal FB to the control circuit 308. A resistor 322 is coupled between the feedback signal FB and a voltage level VCC3 furnished by a linear regulator inside the control circuit 308.

The non-inverting input of the amplifier 312 is connected to the OFFSET terminal and the FBK signal furnished by the frequency compensation network 324. The frequency compensation network 324 is also coupled to feedback ground and is coupled to the VOUT' voltage level.

In summary, the DC-DC converter 202 includes conventional buck converter power circuitry 300 to generate the output voltage level VOUT'. The voltage level VOUT' is provided to either the CPU 200a or the CPU 200b through the transistor 302. The transistor 302 couples the VOUT' voltage level to either the power plane 208 or 210. The control circuit 308 provides the switching signals to the buck converter power circuitry 300 and regulates the output of the buck converter power circuitry 300 using conventional control techniques.

The feedback circuitry 310 provides the feedback signal FB to the control circuit 308 and provides high gain which enables tight control of the output voltage level. The OFFSET terminal of the offset selection circuit 326 provides the offset bias voltage level to the feedback circuit 310 in order to allow output voltages below 2.5 volts.

The voltage reference level VR is a function of the equivalent Thevenin voltage level and resistance looking in the output of the reference selection circuit 330 which varies with the VID<3..0> signal. Therefore, the under and over voltage protection windows of the voltage protection circuit 306 varies according to the value of the voltage identification signal VID<3..0>.

b. The Buck Converter Power Circuitry

Figure 6:
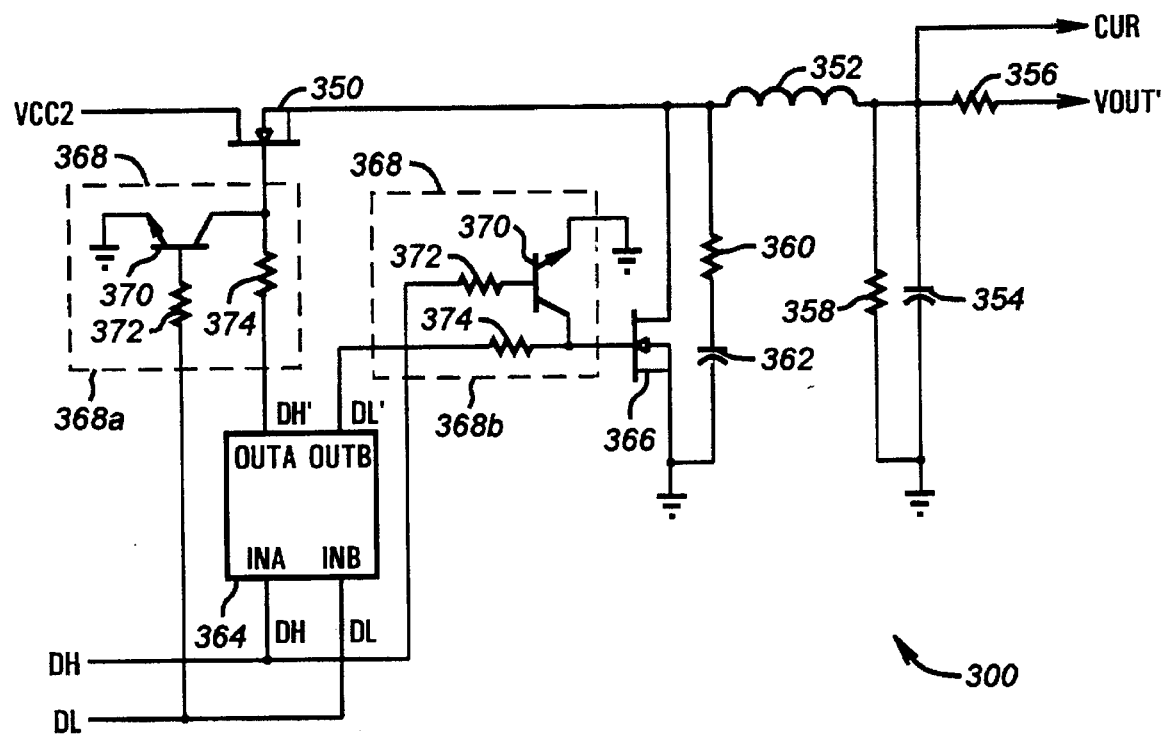
FIG. 6 is a schematic diagram illustrating the design and operation of the buck converter power circuitry of FIG. 5.

Shown in FIG. 6 is a schematic diagram illustrating the design and operation of the buck converter power circuitry 300. The power circuitry 300 includes the main buck converter N-channel MOSFET 350 which has its drain connected to the VCC2 voltage level and its source connected to one end of an inductor 352.

The transistor 350 functions as an on/off switch. The transistor 350 conducts when the control signal DH is asserted and does not conduct when the control signal DH is negated. The source of the transistor 350 is also connected to the drain of the N-channel MOSFET 366, which has its source connected to the power plane ground. The transistor 366 conducts when the control signal DL is asserted and does not conduct when the control signal DL is negated. The transistor 366 takes the place of the traditional rectifier in the buck converter power circuitry 300. The transistor 366 functions as an on/off switch.

The other end of the inductor 352 is connected to one end of a resistor 358 and one end of a current sensing resistor 356. This end of the inductor also provides the CUR signal. The other end of the capacitor 354 is connected to the power plane ground, and the other end of the current sensing resistor 356 provides the VOUT' voltage level. Thus, the above-described circuitry forms a conventional buck converter topology with the current sensing provided to the control circuit 308 through the CUR and VOUT' signals.

A resistor 358 is used to provide a minimal load to the buck converter power circuitry 300 before the transistor 302 (FIG. 5) conducts and couples the buck converter power circuitry 300 to either the power plane 208 or 210. The resistor 358 has one end connected to the CUR signal, and the other end of the resistor 358 is connected to the power plane ground.

A low pass filter is also included in the power circuitry 300. A resistor 360 has one end connected to the source of the transistor 350, and the other end of the resistor 360 is connected to one end of a capacitor 362. The other end of the capacitor 362 is connected to the power plane ground.

The remaining circuitry of the buck converter power circuitry 300 is used to provide drive circuitry for the transistors 350 and 366. Switching circuits 369a and 368b drive the transistors 350 and 366, respectively. The switching circuits 368a and 368b are of common design 368. A MOSFET driver circuit 364 receives the DH and DL control signals and provides the respective buffered switching signals DH' and DL'. The DH' and DL' signals are received by the switching circuits 368a and 368b, respectively.

The switching circuit 368 includes an NPN bipolar-junction-transistor (BJT) 370 which has its emitter coupled to the power plane ground. The base of the transistor 370 is connected to one end of a resistor 372. The collector of the transistor 370 is connected to one end of a resistor 374. The collector of the transistor 370 of the switching circuit 368a is connected to the gate of the transistor 350. The collector of the transistor 370 of the switching circuit 368b is connected to the gate of the transistor 366.

The switching circuits 368a and 368b receive complementary signals to drive their respective MOSFETs. The other end of the resistor 372 of the switching circuit 368a receives the switching signal DL. The other end of the resistor 372 of the switching circuit 368b receives the switching signal DH. The other end of the resistor 374 of the switching circuit 368a receives the DH' control signal. The other end of the resistor 374 of the switching circuit 368b receives the control signal DL'.

In summary, the buck converter power circuitry 300 includes a conventional buck converter topology with the transistor 366 taking the place of the conventional rectifier. The MOSFET driver circuit 364 in conjunction with the switching circuits 368a and 368b drives the main buck converter transistor 350 and the synchronous rectifying transistor 366. The current sensing resistor 356 allows the control circuit 308 to monitor the output current of the DC-DC converter 202.

c. The Feedback Control Circuit

Figure 7:
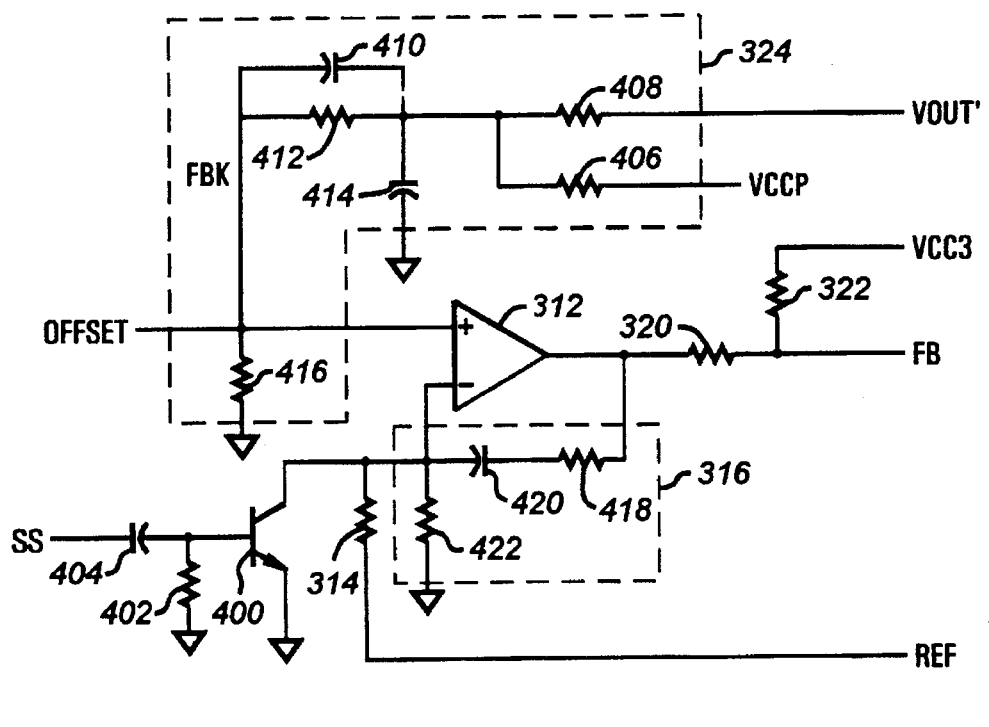
FIG. 7 is a schematic diagram illustrating the design and operation of the control circuit of FIG. 5.

Shown in FIG. 7 is a schematic diagram illustrating the design and operation of the feedback control circuit 310. An NPN BJT 400 has its collector coupled to the inverting input of the amplifier 312 and its emitter coupled to the feedback ground.

The base of the transistor 400 is coupled to one end of a resistor 402, and the other end of the resistor 402 is coupled to the feedback ground. The base of the transistor 400 is also coupled to one end of capacitor 404. The other end of the capacitor 404 is connected to a soft start output terminal SS of the control circuit 308.

When the control circuit 308 first receives power, the transistor 400 pulls the inverting input of the amplifier 312 to ground. As the DC-DC converter 202 gradually powers up, the current in the transistor 400 is decreased accordingly. When the DC-DC converter 202 is powered up, the transistor 400 does not conduct, and the voltage level of the inverting input of the amplifier 312 is established by the REF voltage level.

The compensation network 316, which provides gain and frequency compensation fox the amplifier 312, includes a resistor 418. The resistor 418 has one end coupled to the output of the amplifier 312, and the other end of the resistor 418 is connected to one end of a capacitor 420. The other end of the capacitor 420 is connected to the inverting input of the amplifier 312. A resistor 422 is connected between the inverting input of the amplifier 312 and the feedback ground.

The compensation network 324 includes a resistor 408 having one end connected to the VOUT' voltage level. The other end of the resistor 408 is connected to one end of a resistor 406, one end of a capacitor 410, one end of a resistor 412 and one end of a capacitor 414. The other end of the resistor 406 is connected to the VCCP voltage level. The other end of the capacitor 414 is connected to the feedback ground. The other end of the resistor 412 and the other end of the capacitor 410 furnish the FBK signal which is provided to the non-inverting input of the amplifier 312.

The non-inverting input of the amplifier 312 is further connected to one end of a resistor 416 which has its other end connected to the feedback ground. The non-inverting input of the amplifier 312 is further coupled to the OFFSET terminal. Thus, the offset voltage level provided by the OFFSET terminal and the feedback signal FBK are summed at the non-inverting input of the amplifier 312.

In summary, the feedback network 310 includes the compensation network 316 coupled between the inverting input of the amplifier 312 and its output. Through the softstart output terminal SS, the control circuit 308 allows the feedback circuit 310 to adjust the output voltage level of the DC-DC converter 202 accordingly as the DC-DC converter 202 powers up. The compensation network 324 is coupled between the VOUT' voltage level and the non-inverting input of the amplifier 312. The output voltage level of the DC-DC converter 202 appears to be larger than actual to the control circuit 308 because of the offset bias voltage level furnished by the OFFSET terminal to the non-inverting input of the amplifier 312.

d. Offset Selection Circuit

Figure 8:
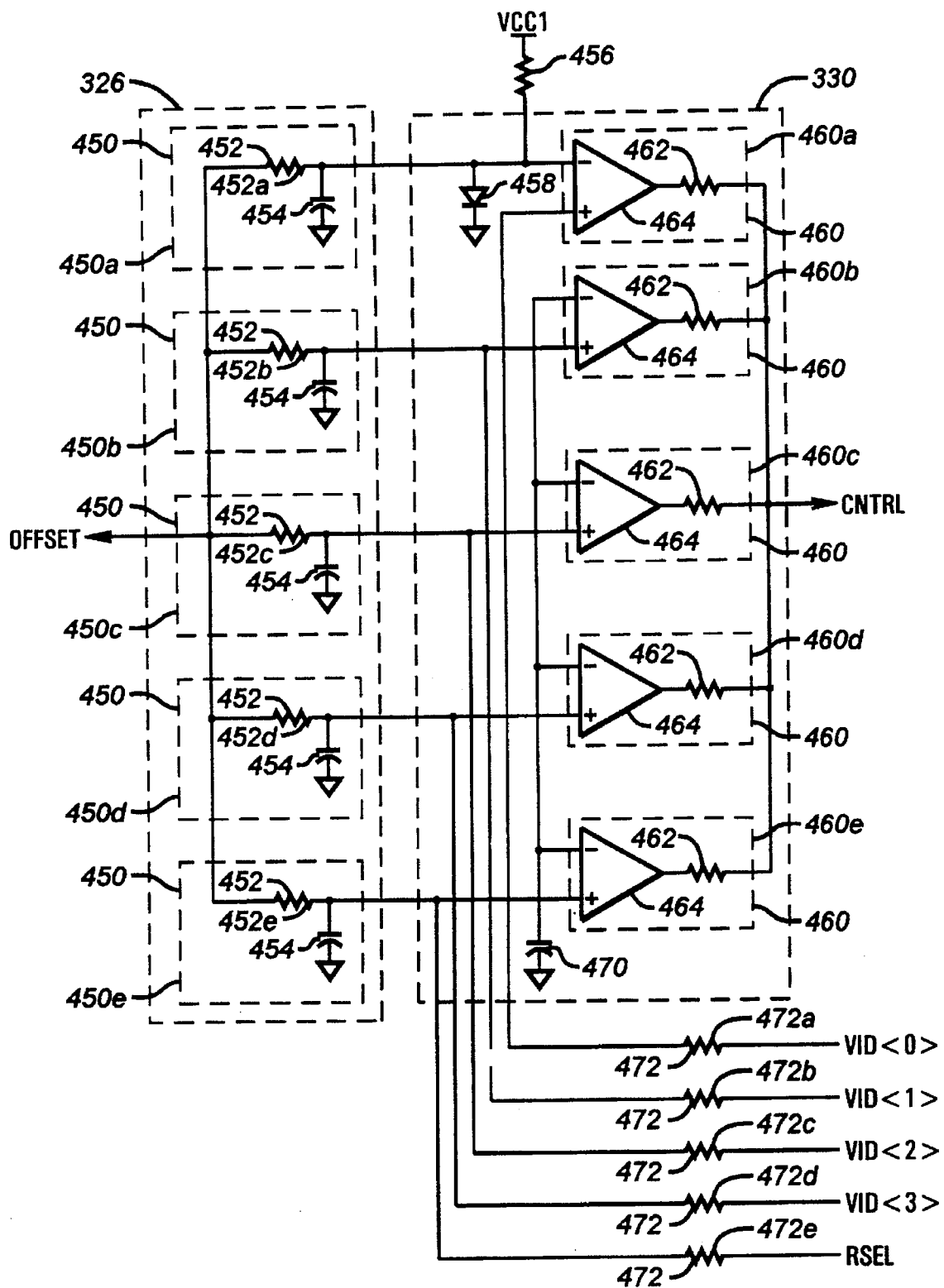
FIG. 8 is a schematic diagram illustrating the design and operation of the offset selection and reference selection circuits of FIG. 5.

Shown in FIG. 8 is a schematic diagram illustrating operation of the offset selection circuit 326 which provides the voltage level of the OFFSET terminal. The offset selection circuit 326 receives the voltage identification signal VID<3..0> and the range select signal RSEL. As noted above, the range select signal RSEL is always negated in the described embodiment. As previously described, the voltage identification signal VID<3..0> is pulled high by the CPU 200 if not grounded by the DIP switches 203 or 205.

The offset selection circuit 326 includes five selection circuits 450a, 450b, 450c, 450d and 450e whose elements are referenced by the suffixes "a," "b," "c," "d," and "e," respectively. These selection circuits are of common design 450. The selection circuits 450 are each coupled to a voltage level representative of the logic level of a separate bit of the voltage identification signal VID<3..0>.

The selection circuit 450a is serially coupled to the VID<0> signal through a resistor 472a; the selection circuit 450b is serially coupled to the VID<i> signal through a resistor 472b; the selection circuit 450c is serially coupled to the VID<2> signal through a resistor 472c; the selection circuit 450d is serially coupled to the VID<3> signal through a resistor 472d; and the selection circuit 450e is serially coupled to the range select signal RSEL through a resistor 472e. The RSEL signal is coupled to ground.

In each selection circuit 450, a resistor 452 is coupled between the appropriate voltage identification signal VID<3..0> bit and the OFFSET terminal. Furthermore, in each selection circuit 450, a capacitor 454 is coupled between the appropriate VID<3..0> bit and the feedback ground. The capacitors 454 serve to hold the voltage levels provided by the VID<3..0> signal in the event of a glitch in the level of these bits.

The resistors 452 distinguish each of the selection circuits 450. The values of the resistors 452a, 452b, 452c, 452d and 452e are chosen to properly select the output voltage level of the DC-DC converter 202 according to the output voltage level indicated by the VID<3..0> signal. Thus, for each four bit value of the VID<3..0> signal, a different voltage level appears on the OFFSET terminal.

In summary, the offset selection circuit 326 furnishes the voltage level of the OFFSET terminal which, through the feedback circuit 310, sets the voltage output level of the DC-DC converter 202. The capacitors 454 hold the voltages provided by the voltage identification signals VID<3..0>. Each of the bits of the voltage identification signal VID<3..0> act, by the principal of superposition, to properly compensate the feedback network 310 so the DC-DC converter 202 provides the desired output voltage level.

e. The Reference Selection Circuit

Also shown in FIG. 8 is a schematic diagram illustrating the design and operation of the reference selection circuit 330. The output voltage and output resistance of the reference selection circuit 330 seen looking into its output terminal CNTRL is selected by the voltage identification signal VID<3..0>, as discussed further below.

The reference selection circuit 330 includes selection circuits 460a, 460b, 460c, 460d and 460e, of common design 460. The elements of these selection circuits 460 are referenced by the suffixes "a," "b," "c," "d," and "e," respectively. The selection circuit 460e receives the range select signal RSEL; however, as previously discussed, the range select signal RSEL is grounded in the described embodiment. Voltage levels representative of the logic level of the bits of the voltage identification signal VID<3..0> and the RSEL signal are provided to the selection circuits 460a–e through the resistors 472, just as these signals are provided to the selection circuits 450a–e.

Each of the selection circuits 460 includes a comparator 464 which has its non-inverting input coupled to one of the bits of the voltage identification signal VID<3..0>. The selection circuit 460a is serially coupled to the VID<0> signal through the resistor 472a. The selection circuit 460b is serially coupled to the VID<i> signal through the resistor 472b. The selection circuit 460c is serially coupled to the VID<2> signal through the resistor 472c. The selection circuit 460d is serially coupled to the VID<3> signal through the resistor 472d. The selection circuit 460e is serially coupled to the range select signal RSEL through the resistor 472e.

The inverting inputs of the comparators 464 of each selection circuit 450 is connected to one end of a resistor 456 and one end of a capacitor 470. The other end of the resistor 456 is connected to the voltage level VCC1, and the other end of the capacitor 470 is connected to the feedback ground. The inverting inputs of the comparators 464 are also connected to the anode of a diode 458 whose cathode is connected to the feedback ground.

The capacitor 470 provides a softstart capability for the reference selection circuit 330. The non-inverting inputs of the comparators 464 are initially grounded by the capacitor 470 and rise to the on-voltage level of the diode 458 after the DC-DC converter 202 has powered up.

In summary, the output terminal CNTRL of the reference selection circuit 330 provides an output voltage and resistance used by the voltage reference circuit 328 and the shutdown circuit 332. The output voltage and resistance of the reference selection circuit 330 is a function of the voltage identification signal VID<3..0>.

f. The Voltage Reference Circuit

Shown in FIG. 9 is a schematic diagram of the voltage reference circuit 328. A linear shunt voltage regulator 500 provides the reference voltage level VR at its cathode. The anode of the regulator 500 is connected to the feedback ground. The reference voltage terminal of the shunt regulator 500 is connected to the CNTRL terminal, one end of a capacitor 506 and one end of a resistor 502.

The other end of the capacitor 506 and the other end of the resistor 502 are both connected to the cathode of the shunt regulator 500. A resistor 504 is coupled between the cathode of the shunt regulator 500 and the VCC1 voltage level. A capacitor 508 is coupled between the voltage level VR and the feedback ground.

The voltage protection circuit 306 receives the VR voltage level and determines the acceptability of the output voltage level of the DC-DC converter 202 based on the voltage level VR. Because the output resistance and voltage level of the reference selection circuit 330 is a function of the voltage identification signal VID<3..0>, the VR voltage level also varies accordingly with the VID<3..0> signal.

g. The Over/Under Voltage Protection Circuit

Shown in FIG. 10 is a schematic diagram illustrating operation of the under/over voltage protection circuit 306.

Overvoltage circuitry includes an undervoltage comparator 552 which has its inverting input connected to one end of capacitor 576. The non-inverting input of the comparator 552 is connected to one end of a resistor 588 and one end of a resistor 590.

The other end of the capacitor 576 and the other end of the resistor 590 are connected to the feedback ground. The other end of the resistor 588 is connected to one end of resistor 586. The other end of the resistor 586 receives the voltage reference level VR. The voltage level at the non-inverting input of the comparator 552 is a minimum acceptable output voltage level for the DC-DC converter 202.

When the DC-DC converter 202 is first powered up, the inverting input of the comparator 552 is negated as the capacitor 576 pulls the inverting input to ground. Once the DC-DC converter 202 is powered up, the inverting input of the comparator 552 is pulled to the VOUT' voltage level.

A resistor 578 has one end connected to the inverting input of the comparator 552, and the other end of the resistor 578 is connected to one end of a resistor 584. The other end of the resistor 584 has its other end connected to the VOUT' voltage level. Thus, when first powered up, the comparator 552 compares the voltage level VOUT' with the minimum acceptable output voltage level.

If the voltage level VOUT' is below the minimum acceptable voltage level, the output of the comparator 552 is asserted. This negates the PWROK signal, as explained below. A resistor 556 is coupled between the voltage level VCCP and the output of the comparator 552. The output of the comparator 552 is further coupled to the anode of a diode 562 which has its cathode connected to the gate of an N-channel MOSFET 566.

The gate of the transistor 566 has a resistor 564 coupled between the gate and feedback ground. The drain of the transistor 566 is coupled to the cathode of a power failure indicating light emitting diode (LED) 572. The anode of the LED 572 is connected to one end of a resistor 574 which has its other end connected to the VCC1 voltage Level.

The source of the transistor 566 is coupled to the base of an NPN BJT 570. A capacitor 568 is coupled between the base of the transistor 570 and feedback ground. The collector of the transistor 570 provides the PWROK signal. The PWROK signal is normally pulled high by an external resistor (not shown).

Thus, when the voltage level VOUT' is below the minimum acceptable voltage level, as set by the voltage level of the non-inverting input of the comparator 552, the output of the comparator 552 is asserted which negates the PWROK signal. The LED 572 furnishes a visual indication of the status of the PWROK signal.

Now referring to the undervoltage protection circuitry, an overvoltage comparator 550 has its inverting input connected to the junction of the resistor 588 and the resistor 586. The non-inverting input of the comparator 550 is coupled to the VOUT' voltage level through a resistor 582. The resistor 582 is coupled between the non-inverting input of the comparator 550 and the connection of the resistors 584 and 578. The voltage level of the inverting input of the comparator 550 sets a maximum acceptable voltage level for the DC-DC converter 202.

When the DC-DC converter 202 is first powered up, the non-inverting and inverting inputs of the comparator 550 are shorted together by a capacitor 580 coupled between these inputs. Positive feedback circuitry is coupled to the comparator 550 to increase the response time of the comparator 550. This positive feedback circuitry includes a diode 581 having its anode coupled to the output of the comparator 550 and its cathode connected to the non-inverting input of the comparator 550. This positive feedback circuitry further includes a capacitor 583 coupled between the non-inverting input of the comparator 550 and its output.

Thus, when the DC-DC converter 202 is first powered up, if the voltage level VOUT' is above the maximum acceptable voltage level, the output of the comparator 550 is asserted. The output of the comparator 550 is coupled to the VCCP voltage level through a resistor 558. The output of the comparator 550 is also coupled to the gate of the transistor 566 through a diode 560. The diode 560 has its anode connected to the output of the comparator 550 and its cathode connected to the gate of the transistor 566. The cathode of the diode 560 further provides the EN2 signal.

Thus, when the voltage level VOUT' is above the maximum acceptable voltage level, the EN2 signal is asserted which pulls the VOUT' voltage level to ground. This causes the control circuit 308 to shut down the DC-DC converter 202. Furthermore, when the EN2 signal is asserted, the PWROK signal is negated.

When the DC-DC converter 202 first powers up, the under/over voltage protection circuit 306 monitors the output voltage level of the DC-DC converter 202 using the VOUT' voltage level. However, once the DC-DC converter 202 is fully powered up, the protection circuit 306 monitors the voltage level provided to the supply voltage inputs of the CPUs 200a and 200b, VCCPA and VCCPB, respectively. An N-channel MOSFET 585 is used to accomplish this.

The drain of the transistor 585 is coupled to the voltage level VCCP. The source of the transistor 585 is connected to the union of the resistors 584, 578 and 582. The gate of the transistor 585 is connected to the output of a comparator 554. The output of the comparator 554 is coupled to the VCC1 voltage level through a resistor 596. Thus, when the output of the comparator 554 is asserted, the transistor 585 conducts which effectively sets the output voltage level monitored by the voltage protection circuit 306 to the VCCP voltage level instead of the VOUT' voltage level. This enables the remote sensing capability of the DC-DC converter 202.

The EN1 signal is asserted by the voltage protection circuit 306 once the DC-DC converter 202 powers up. The non-inverting input of the comparator 554 is coupled to the VOUT' voltage level through a resistor 594. The inverting input of the comparator 554 is coupled to the VOUT voltage level through a resistor 592. The output of the converter 554 further provides the EN1 signal.

Thus, when the VOUT' voltage level is greater than the VOUT level, the EN1 signal is asserted which couples the VOUT' voltage level to either the power plane 208 or 210. Furthermore, when this occurs, the voltage protection circuit 306 monitors the operating conditions of the DC-DC converter 202 relative to the voltage level VCCP rather than the output voltage level VOUT'.

In summary, the undervoltage comparator 552 monitors the output voltage of the DC-DC converter 202 and negates the PWROK signal if the voltage level provided by the DC-DC converter 202 falls below the minimum acceptable voltage level. The overvoltage comparator 550 also monitors the output voltage level of the DC-DC converter 202 and negates the PWROK signal if the output voltage level rises above the maximum acceptable voltage level. Upon either fault condition, the EN2 signal is asserted which negates the VOUT' voltage level and shuts down the DC-DC converter 202.

Once the DC-DC converter 202 has powered up, the EN1 signal asserted by the comparator 554 which allows the voltage protection circuit 306 to monitor the voltage levels present at the supply voltage inputs of CPUs 200. When the EN1 signal is asserted, the transistor 362 conducts which couples the output of the buck converter power circuitry 300 to the power plane 208 or 210.

h. The Shutdown Circuit

Shown in FIG. 11 is a schematic diagram illustrating operation of the shutdown circuitry 332. The shutdown circuitry 332 compares a voltage level proportional to VCC2 with the voltage level of the CNTRL terminal. The function of the shutdown circuitry 332 is to shutdown the DC-DC converter 202 when the VID<3..0> signal is equal to "b1111." This indicates no CPU 200 is available for the particular DC-DC converter 202.

A resistor divider network which includes a resistor 602 and a resistor 604 is coupled between the VCC2 voltage level and the feedback ground. The junction of the resistors 602 and 604 is connected to the non-inverting input of the comparator 600 and furnishes the voltage level to be compared with the inverting input of the comparator 600. The inverting input of the comparator 600 is connected to the CNTRL terminal.

The output of the comparator 600 is connected to one end of a resistor 606 whose other end provides the SD# signal. The SD# signal is further coupled to the anode of a diode 608. The cathode of the diode 608 is coupled to one end of a resistor 610 and the anode of a zener diode 612. The other end of the resistor 610 is connected to the feedback ground, and the cathode of the diode 612 is connected to the VCC1 voltage level.

Thus, when the VID<3..0> signal equals "b1111," the voltage level of the CNTRL terminal rises above the voltage level of the non-inverting input of the comparator 600. When this occurs, the SD# signal is asserted which shuts down the control circuit 308 and the DC-DC converter 202.

6. The Stopclock Toggle Circuit a. Overview

Shown in FIG. 12 is a block diagram illustrating the design of the stopclock toggle circuit 156. In the following discussion, the subscript "$_{100a}$" references signals and components from the CPU card 100a, and the subscript "$_{100b}$" references signals and components from the CPU card 100b.

A failure detection circuit 683a provides a failure detection signal FAILA at its output. When asserted, the FAILA signal indicates either an over temperature condition or a critical power failure on the CPU card 100a. The FAILA signal is negated otherwise. The assertion of the FAILA signal enables the stopclock toggle circuit 156 to place the CPUs 200$_{100a}$ in alternative stopclock modes.

A failure detection circuit 683b provides a failure detection signal FAILC at its output. Both the failure detection circuits 683a and 683b are of common design 683. When asserted, the FAILC signal indicates an over temperature condition or a critical power failure on the CPU card 100b. The FAILC signal is negated otherwise. The assertion of the FAILC signal enables the stopclock toggle circuit 156 to place the CPUs 200$_{100b}$ in alternative stopclock modes.

A D-type flip-flop 652 synchronizes the input signals provided to the stopclock toggle circuit 156 to the positive edge of a received PCI clock signal CLK. It is to be noted that because the PCI clock is synchronized with the clock of the CPUs 200 in the described embodiment, the PCI clock signal is used. The flip-flop 652 receives the FAILA signal at its first input and provides a synchronized version of the FAILA signal, $GO_{13}A$, at its first non-inverting output. The FAILC signal is received by the second input of the flip-flop 652, and the second non-inverting output of the flip-flop 652 furnishes a synchronized version of this signal, $GO_{13}C$.

The fourth input of the flip-flop 652 receives a timeout signal TOUT, and the fourth non-inverting output of the flip-flop 652 provides a synchronized version of this signal, TIME. The TIME signal is furnished to the third input of the flip-flop 652. The non-inverting third output of the flip-flop 652 provides a TIMEDLY signal which is the TIME signal delayed by one cycle of the CLK signal.

As explained further below, the TIME and TIMEDLY signals are used to detect the rising edge of the TOUT signal. The TOUT signal is furnished by the output of a timer circuit 654 and is used to generate a stopclock delay for holding one of the CPUs 200 in the stopclock mode. The length of the stopclock delay is equal to the time interval from the falling edge of the TOUT signal to the rising edge of the TOUT signal.

The flip-flop 652 receives a PCI reset signal RST at its fifth input, and the flip-flop 652 provides a corresponding synchronized signal SYNCRST# at its fifth non-inverting output. The enable input of the flip-flop 652 is coupled to ground through a resistor 660.

A stopclock circuit 650 furnishes STPCLKA#, STPCLKB#, STPCLKC# and STPCLKD# signals. The assertion of these signals indicates a stopclock mode request to the CPU $200a_{100a}$, CPU $200b_{100a}$, CPU $200a_{100b}$ and CPU $200b_{100b}$, respectively. The signals are otherwise negated. The stopclock circuit 650 receives the CLK, STPGNT#, SYNCRST#, TIME, TIMEDLY, $GO_{13}C$, GO_A and FRCMODE signals.

Once one of the CPUs 200 grants the stopclock mode request, the particular CPU 200 enters a known stopclock mode. In the stopclock mode, the CPU 200 consumes very little power. Each of the DC-DC converters 202 is sized to power one CPU 200 in its normal mode of operation and one CPU 200 in the stopclock mode. Each of the DC-DC converters 202 is not sized to power two CPUs 200 in their normal mode of operation. Thus, by alternating stopclock modes, two CPUs 200 on one CPU card 100 can remain operational although only powered by one DC-DC converter 202.

The grant of the stopclock mode request is indicated by the assertion of the STPGNT# signal by the bridge circuit 124. Once one of the CPUs 200 enters the stopclock mode, the particular CPU 200 remains in the stopclock mode until the associated STPCLK# signal is deasserted.

The stopclock circuit 650 also furnishes a trigger signal TRIG which is provided to a trigger input on the timer circuit 654. The negation of the TRIG signal by the stopclock toggle circuit 650 initiates the stopclock delay indicated by the TOUT signal.

In the described embodiment, the trigger circuit 654 is a 555 timer with its trigger input receiving the TRIG signal and its reset input coupled to the VCC2 voltage level through a resistor 666. The control input of the timer 654 is coupled to ground through a capacitor 668; therefore, this allows a softstart for the timer circuit 654.

The threshold input of the timer 654 is coupled to the discharge input of the timer 654. The discharge input of the timer 654 is Coupled to one end of a capacitor 672 and one end of a resistor 670. The other end of the capacitor 672 is coupled to ground, and the other end of the resistor 670 is coupled to the VCC2 voltage level.

Thus, the timer 654 is configured as a monostable multivibrator. When the trigger input of the timer 654 is negated by the TRIG signal, the TOUT signal provided by the timer 654 is negated for the stopclock delay which is determined by the values selected for the resistor 670 and the capacitor 672. When not measuring the stopclock delay, the TOUT signal is asserted. At the end of the stopclock delay, the TOUT signal is asserted. In order to initiate the stopclock delay, the TRIG signal is negated for one cycle of the CLK signal.

A buffer circuit 656 receives the STPCLKC#, STPCLKD#, STPCLKA# and the STPCLKB# signals at its four inputs. The buffer circuit 656 provides a STOPCLKC# signal, a STOPCLKD# signal, a STOPCLKA# signal and a STOPCLKB# signal to the CPU cards 100. These signals correspond to the STPCLKC#, STPCLKD#, STPCLKA# and STPCLKB# signals, respectively.

The STOPCLKC# and STOPCLKD# signals are provided to the CPU card 100b. The STOPCLKA# and STOPCLKB# signals are provided to the CPU card 100a. The enable input of the buffer circuit 656 is coupled to ground through a resistor 674.

To summarize, the failure detection circuits 683a and 683b receive temperature and power failure Status signals from the CPU cards 100a and 100b and enable the generation of the STPCLK# A-D signals by the stopclock circuit 650 accordingly. The flip-flop 652 synchronizes the input signals to the stopclock toggle circuit 156 and provides these signals to the stopclock circuit 650.

The timer circuit 654 generates the stopclock delay which is the time interval during which one of the CPUs 200 remains in the stopclock mode. The stopclock circuit 650 furnishes the STPCLK# A-D signals to the buffer circuit 656 which provides the STOPCLK# A-D signals to the CPUs 200.

b. The Failure Detection Circuits

The failure detection circuits 683a and 683b are of common design 683. The failure detection circuit 683a receives status signals from the CPU card 100a as referenced by the subscript "$_{100a}$." The failure detection circuit 683b receives status signals from the CPU card 100b as referenced by the subscript "$_{100b}$."

Now referring to FIGS. 19 and 20, the failure circuit 683 includes an AND gate 689 which receives the PWROKa and the INSTALLED# a signals. An AND gate 691 receives the PWROKb and the INSTALLED#b signals. An AND gate 693 receives the PWROKc and the INSTALLED#c signals. The inverted outputs of the AND gates 689, 691 and 693 are furnished to the inputs of an XOR gate 684 and the inputs of an unequal circuit 685.

The output of the unequal circuit 685 is asserted if its inputs are unequal. The output is negated otherwise. The output of the unequal circuit 685 and the inverted output of the XOR gate 684 are provided to the inputs of an AND gate 687. The output of the AND gate 687 is connected to one input of an AND gate 682.

The AND gate 682 also receives the PRSNTA signal, the PRSNTB signal, the VIDERR# signal and the inverted FULLRED# signal. The output of the AND gate 682 is furnished to one input of an OR gate 680. The output of the OR gate 680 provides the FAILA signal in the failure detection circuit 683a and the FAILC signal in the failure detection circuit 683b.

Thus, the FAILA signal or the FAILC signal is asserted if several conditions are met which indicate that only one DC-DC converter 202 is available to power two CPUs 200. First, only one DC-DC converter 202 must be functioning properly on the particular CPU card 100. Furthermore, both CPUs 200 on this CPU card 100 must be installed. The voltage identification signals VIDA<3..0> and VIDB<3..0> must be identical as indicated by the VIDERR# signal. Finally, the power planes 208 and 210 of this CPU card 100 must by coupled together as indicated by the FULLRED# signal. When these conditions are met, the failure circuit 683a or 683b asserts its FAILA or FAILC signal.

The FAILA or FAILC signal is also asserted if an over temperature conditions exists as indicated by the assertion of the TEMPC signal. The TEMPC signal is received by the other input of the OR gate 680.

In summary, the FAILA or FAILC signals are asserted if one of two events occurs. First, these signals are asserted if, on their respective CPU card 100, two CPUs 200 require power from one DC-DC converter 202. These signals are also asserted if an over temperature condition occurs on their respective CPU card 100.

c. The Stopclock Circuit i. Overview

Shown in FIG. 13 is a block diagram illustrating the operation and design of the stopclock circuit 650. An A/B state machine 700 generates the STPCLKB# and the STPCLKA# signals. A C/D state machine 702 generates the STPCLKC# and the STPCLKD# signals.

A synchronization state machine 704 synchronizes the output signals of the state machines 700 and 702 and cooperates with the state machines 700 and 702 to determine if any outstanding stopclock mode requests exist. This is dependent on whether both state machines 700 and 702 are enabled. The state machine 704 receives the STPCLKA#, STPCLKB#, STPCLKC#, STPCLKD#, STPGNT# and SYNCRST# signals. The state machine 704 furnishes an output signal SYNCSM to the state machines 700 and 702 to accomplish the above-described results. The SYNCSM signal is asserted after the STPGNT# signal is asserted. The SYNCSM signal is subsequently negated under the conditions described below.

The A/B state machine 700 receives the GO—A, SYNCRST#, FRCMODE, STPGNT#, TIMEDLY, TIME, CLK, STPCLKC# and STPCLKD# signals. The C/D state machine 702 receives the GO_C, SYNCRST#, FRCMODE, STPGNT#, TIMEDLY, TIME, CLK, STPCLKA# and STPCLKB# signals.

The remaining circuitry shown in FIG. 13 is used to generate the TRIG signal. The negation of the TRIG signal initiates the stopclock delay. The SYNCSM signal is received by one input of an AND gate 708. The other input of the AND gate 708 is connected to the output, of an OR gate 712. The output of the AND gate 708 is connected to the input of a D-type flip-flop 710 which is clocked by the positive edge of the CLK signal. The inverting output of the flip-flop 710 provides the TRIG signal.

The inverted STPGNT# signal is received by one input of the OR gate 712. Another input of the OR gate 712 is provided by the output of an AND gate 714. The third input of the OR gate 712 is connected to the output of an AND gate 716.

One input of the AND gate 714 receives the STPCLKA# signal, and the other input of the AND gate 714 receives the STPCLKB# signal. One input of the AND gate 716 receives the STPCLKD# signal, and the other input of the AND gate 716 receives the STPCLKC# signal.

Thus, the TRIG signal is negated on the next positive edge of the CLK signal after the concurrent assertion of the SYNCSM and the STPGNT# signals. As further explained below, this occurs when two stopclock mode requests have been granted.

The TRIG signal is also negated on the next positive edge of the CLK signal after the concurrent deassertion of the STPCLKA# and STPCLKB# signals and the assertion of the SYNCSM signal. This occurs when a stopclock mode request from the state machine 700 has been granted and no other stopclock mode request is outstanding. The TRIG signal is also negated on the next positive edge of the CLK signal after the concurrent deassertion of the STPCLKC# and STPCLKD# signals and the assertion of the SYNCSM signal. This occurs when a stopclock mode request from the state machine 702 has been granted and no other stopclock mode request is outstanding.

Other embodiments of the present invention are envisioned. These embodiments might include more than two CPUs 200 which require power from only one DC-DC converter 202. In these embodiments, the stopclock toggle circuit 156 ensures that only one CPU 200 at a time is in its normal mode of operation. The other CPUs 200 are in stopclock modes.

ii. The A/B and C/D State Machines

FIG. 14 is a state diagram illustrating operation of the A/B state machine 700, and FIG. 15 is a state diagram illustrating operation of the C/D state machine 702. Because both state machines 700 and 702 operate in a similar fashion, only the detailed description of the state machine 700 is given below.

The state machine 700 enters state A when the SYNCRST# signal is asserted, which indicates a PCI reset. In state A, the STPCLKA# and the STPCLKB# signals are deasserted. The state machine 700 remains in state A as long as the $GO_{13}$ A signal is negated. If the FAILA signal is asserted, then the $GO_{13}$ A signal is subsequently asserted. This causes the state machine 700 to transition from state A to state B.

In state B, the STPCLKB# signal is asserted. This sends a stopclock mode request to the CPU $200b_{100a}$. If the FRCMODE signal is asserted, then the state machine 700 remains in state B. Otherwise, if the SYNCSM signal is asserted and either the STPGNT# signal is asserted or both the STPCLKC# and the STPCLKD# signals are deasserted, then the state machine 700 transitions from state B to state C.

When the SYNCSM signal is asserted, there are two possible conditions. First, the C/D state machine 702 does not have an outstanding stopclock mode request with the CPU card 100b. Thus, after the assertion of the STPGNT# signal, no outstanding stopclock mode requests remain. When this occurs, both the STPCLKC# and the STPCLKD# signals are deasserted, and the SYNSCM signal is asserted. This indicates that one assertion of the STPGNT# signal has been detected. Because there was only one active stopclock mode request from the state machine 700, one assertion of the STPGNT# signal indicates the CPU $200b_{100a}$ has entered the stopclock mode. Thus, the state machine 700 transitions from state B to state C, the state during which the stopclock delay is generated.

The other condition that might exist when the SYNCSM signal is asserted is that one stopclock mode request might be outstanding. In this case, either the STPCLKC# or the STPCLKD# signal is asserted. The next assertion of the STPGNT# signal indicates two assertions of the STPGNT# signal has been detected. Thus, once this occurs, both the CPU $200b_{100a}$ and the CPU $200b_{100b}$ have entered the stopclock mode. Upon this occurrence, the state machine 700 transitions from state B to state C. If none of the above conditions are met, the state machine 700 remains in state B.

In state C, the STPCLKA# signal remains deasserted, and the STPCLKB# signal remains asserted. The state machine 700 remains in state C until the rising edge of the TOUT signal is detected by the state machine 700. The state machine 700 detects this transition of the TOUT signal by monitoring the TIME and TIMEDLY signals. This transition is detected when the TIME signal is negated and the TIMEDLY signal is asserted. This indicates the end of the stopclock delay generated by the timer circuit 654. Upon this occurrence, the state machine 700 transitions from state C to state D.

In state D, the STPCLKA# signal is asserted which initiates a stopclock mode request to the CPU $200a_{100a}$. If the SYNCSM signal is asserted and either the STPGNT# or the STPCLKC# and the STPCLKD# signals are both deasserted, then the state machine 700 transitions from state D to state E. Otherwise, the state machine 700 remains in state D. Similar to the conditions preceding the transition from state B to state C, the transition depends on whether the C/D state machine 702 has an outstanding stopclock mode request with the CPU $200b_{100b}$.

In state E, the STPCLKB# signal is deasserted. The state machine 700 remains in state E until the falling edge of the TOUT signal is detected. This indicates the CPU $200a_{100b}$ has remained in the stopclock mode for the duration of the stopclock delay. When this occurs, the state machine transitions to state F.

In state F, the STPCLKB# signal is asserted which initiates a stopclock mode request to the CPU $200b_{100a}$. If the SYNCSM signal is asserted and either the STPGNT# signal is asserted or both the STPCLKC# and the STPCLKD# signals are deasserted, then the state machine 700 transitions to state C. Otherwise, the state machine 700 remains in state F.

iii. The Synchronization State Machine

Shown in FIG. 16 is the state diagram of the synchronization state machine 704. As described above, the synchronization state machine 704 cooperates with the A/B state machine 700 and the C/D state machine 702 to synchronize their outputs and determine the presence of outstanding stopclock mode requests.

If both the state machines 700 and 702 have outstanding stopclock mode requests, then the stopclock toggle circuit 156 must receive two assertions of the STPGNT# signal before generating the stopclock delay. If only one state machine 700 or 702 has an outstanding stopclock mode request, then the Stopclock toggle circuit 156 starts the stopclock delay beginning with the detection of the assertion of the STPGNT# signal.

The state machine 704 enters state A when the SYNCRST# signal is asserted which indicates a PCI reset. In state A, the SYNCSM signal is negated. The state machine 704 remains in state A as long as the STPGNT# signal is deasserted. When the STPGNT# signal is asserted, the state machine 704 transitions from state A to state B.

In state B, the SYNCSM signal is asserted. If either the STPGNT# signal is asserted; the STPCLKA# and the STPCLKB# signals are both deasserted; or the STPCLKC# and the STPCLKD# signals are both deasserted, then the state machine 704 transitions from state B back to state A.

iv. Summary

In summary, if the A/B state machine 700 is enabled by the assertion of the FAILA signal, the A/B state machine 700 alternates the stopclock modes of the CPUs $200a_{100a}$ and $200b_{100a}$. Similarly, if the C/D state machine 702 is enabled by the assertion of the FAILC signal, the C/D state machine 702 alternates the stopclock modes of the CPUs $200a_{100b}$ and $200b_{100b}$.

The synchronization state machine 704 cooperates with the state machines 700 and 702 to count the number of assertions of the STPGNT# signal in order to ensure all stopclock mode requests have been granted. The stopclock circuit 650 further includes the circuitry to generate the TRIG signal used to initialize the timer circuit 654 and begin the stopclock delay.

d. Timing Diagrams

FIG. 17 is a timing diagram illustrating operation of the stopclock toggle circuit 156 when the $GO_{13}$ A signal is asserted and the $GO_{13}$ C signal is negated. Thus, the A/B state machine 700 is enabled and the C/D state machine 702 is disabled.

As shown in FIG. 17, on the transition from state A to state B, the STPCLKB# signal is asserted which initiates a stopclock mode request to the CPU $200b_{100a}$. The stopclock toggle circuit 156 remains in state B until the STPGNT# signal is deasserted for one cycle of the CLK signal after the CPU $200b_{100a}$ grants the stopclock mode request. The CPU $200b_{100a}$ then enters the stopclock mode for the stopclock mode delay determined by the values of the resistor 670 and the capacitor 672.

The CPU $200b_{100a}$ remains in the stopclock mode during states C and D. A stopclock mode request is sent to the CPU $200a_{100a}$ beginning with the transition from state C to state D. The length of time the A/B state machine 700 remains in state D is dependent on how long the CPU $200a_{100a}$ waits until it grants its stopclock mode request. Thus, the CPU $200b_{100a}$ remains in the stopclock mode during states C and D as indicated by DELAY B.

When the STPGNT# signal is asserted after the CPU $200a_{100a}$ grants its stopclock mode request, the state machine 700 transitions from state D to state E and the STPCLKB# signal is deasserted which takes the CPU $200b_{100a}$ out of the stopclock mode:

At the beginning of state E, the CPU $200a_{100a}$ enters the stopclock mode until it transitions from state F back to state C. The time during which the stopclock toggle circuit 156 remains in state E is a function of the values of the resistor 670 and the capacitor 672. The time during which the stopclock toggle circuit 156 remains in the state F is dependent on how long it takes the CPU $200b_{100a}$ to grant its next stopclock mode request. The total time the CPU $200a_{100a}$ remains in the stopclock mode is indicated by DELAY A.

FIG. 18 is a timing diagram illustrating operation of the stopclock toggle circuit 156 when both the $GO_{13}$ A and GO_C signals are asserted which enables stopclock toggle operations for both of the CPU cards 100. Thus, both the A/B state machine 700 and the C/D state machine 702 are enabled.

Because the STPGNT# signal does not indicate which stopclock mode request is granted, the stopclock toggle circuit 156, when both the $GO_{13}$ A and $GO_{13}$ C signals are asserted, waits for two assertions of the STPGNT# signal before measuring the time during which one of the CPUs 200 is in the stopclock mode.

The time interval during which the CPU $200b_{100a}$ and CPU the $200b_{100b}$ are in the stopclock mode is indicated by DELAY B and DELAY D, respectively. This time is measured beginning from the transition from state B to state C when the second assertion of the STPGNT# signal is detected. The stopclock toggle circuit 156 remains in state D until two assertions of the STPGNT# signal are detected. This indicates that the stopclock mode requests for the CPUs $200a_{100a}$ and $200a_{100b}$ have been granted.

The CPUs $200a_{100a}$ and $200a_{100b}$ are placed in the stopclock mode in a similar manner. The time interval during which the CPUs $200a_{100a}$ and $200a_{100b}$ are in the stopclock mode is indicated by DELAY A and DELAY C, respectively.

e. Conclusion

In summary, the stopclock toggle circuit 156 is enabled when both of the CPUs 200a and 200b need power from only one functional DC-DC converter 202 on one of the CPU cards 100. Furthermore, the stopclock toggle circuit 156 is enabled when an over temperature condition occurs on one of the CPU cards 100. If enabled for one of the CPU cards 100, the stopclock toggle circuit 156 alternates the stopclock modes of the CPUs 200 on the particular CPU card 100.

7. Conclusion

In summary, the CPU card 100 contains circuitry to provide full redundancy when possible. The CPU card 100 includes the DC-DC converters 202a and 202c which furnish power to the CPU 200a and the DC-DC converter 202b which furnishes power to the CPU 200b. If the voltage identification signals VIDA<3..0> and VIDB<3..0> of the DC-DC converters 202 are equivalent, the identification logic 206 couples the power planes 208 and 210 together through the switch circuit 204.

The DC-DC converter 202 includes conventional buck converter power circuitry 300 to generate the output voltage level provided to the CPUs 200. The DC-DC converter 202 includes the control circuit 308. The control circuit 308 provides the switching signals to the buck converter power circuitry 300 and regulates the output of the buck converter power circuitry 300 using conventional control techniques.

The feedback circuitry 310 of each DC-DC converter 202 has a high gain and receives the offset bias voltage which is summed with the feedback signal FBK. The offset selection circuit 326 provides the offset bias voltage which is selectable through the voltage identification signals VIDA<3..0> and VIDB<3..0>. Thus, this allows the output voltage level of each of the DC-DC converters 202 to have a range from 2.1 to 3.5 volts which is selectable in 0.1 volt increments.

The stopclock toggle circuit 156 is enabled when both CPUs 200a and 200b need to be furnished power from only one functional DC-DC converter 202 on one of the CPU cards 100. The stopclock toggle circuit 156 is also enabled when an over temperature condition occurs on one of the CPU cards 100. If enabled for one of the CPU cards 100, the stopclock toggle circuit 156 alternates the stopclock modes of the CPUs 200 on the particular CPU card 100.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A control system for use in a computer system for controlling power provided to both a first central processing unit and a second central processing unit by a converter sized for concurrently powering one central processing unit in a normal mode of operation and one central processing unit in a known stopclock mode, the first central processing unit capable of entering a first known stopclock mode after receiving an indication of a first stopclock request and remaining in the first known stopclock mode as long as the indication of the first stopclock request is received, the second central processing unit capable of entering a second known stopclock mode after receiving an indication of a second stopclock request and remaining in the second known stopclock mode as long as the indication of the second stopclock request is received, the computer system capable of providing an indication of when the first central processing unit enters the first known stopclock mode and when the second central processing unit enters the second known stopclock mode, the control system comprising:

means coupled to the first central processing unit for providing an indication of the first stopclock request to the first central processing unit for placing the first central processing unit in the first known stopclock mode for a first predetermined time after the computer system indicates the first central processing unit has entered the first known stopclock mode;

means coupled to the second central processing unit and to said means for providing the indication of the first stopclock request signal for providing an indication of the second stopclock request to the second central processing unit for placing the second central processing unit in the second known stopclock mode for a second predetermined time after the computer system indicates the second central processing unit has entered the second known stopclock mode; and wherein said means for providing the indication of the first stopclock request and said means for providing the indication of the second stopclock request cooperate so that either the first central processing unit or the second central processing unit is in the first or second known stopclock mode.

2. The control system of claim 1, wherein the first central processing unit is not in the first stopclock mode when the second central processing unit is in the second stopclock mode.

3. The control system of claim 1, wherein said means for providing the indication of the first stopclock request includes a 555 timer circuit to indicate the first predetermined time.

4. The control system of claim 1, wherein said means for providing the indication of the second stopclock request includes a 555 timer circuit to indicate the second predetermined time.

5. The control system of claim 1, said control system further comprising:

means coupled to said means for providing the indication of the first stopclock request for providing an indication that only one converter is available to provide power to the first and second central processing units, and wherein said means for providing the indication of the first stopclock request is enabled when said means for providing the indication that only one converter is available indicates that only one converter is available to provide power to the first and second central processing units.

6. The control system of claim 1, said control system further comprising:

means coupled to said means for providing the indication of the second stopclock request for providing an indication that only one converter is available to provide power to the first and second central processing units, and wherein said means for providing the indication of the second stopclock request is enabled when said means for providing the indication that only one converter is available indicates that only one converter is available to provide power to the first and second central processing units.

7. The control system of claim 1, said control system further comprising:

means coupled to said means for providing the indication of the first stopclock request for providing an indication of an over temperature condition of one or both of the central processing units, and wherein said means for providing the indication of the first stopclock request is enabled when said means for providing the indication of the over temperature condition indicates the temperature of one or both of the central processing units has exceeded a predetermined maximum temperature.

8. The control system of claim 1, said control system further comprising:

means coupled to said means for providing the indication of the second stopclock request for providing an indication of an over temperature condition of one or both of the central processing units, and wherein said means for providing the indication of the second stopclock request is enabled when said means for providing the indication of the over temperature condition indicates the temperature of one or both of the central processing units has exceeded a predetermined maximum temperature.

9. The control system of claim 1, said control system further comprising:

means coupled to said first and second central processing units and to said means for providing the indication of the first stopclock request for providing an indication of when a first supply voltage level of the first central processing unit is equivalent to a second supply voltage level of the second central processing unit, and wherein said means for providing the indication of the first stopclock request is enabled when said means for providing the indication of the equivalency of the supply voltage levels indicates the supply voltage levels of the first and second central processing units are equivalent.

10. The control system of claim 9, wherein said means for providing the indication of the equivalency of the supply voltage levels further receives a first voltage identification signal indicative of the first supply voltage level and a second voltage identification signal indicative of the second supply voltage level, and wherein said means for providing the indication of the equivalency of the supply voltage levels determines if the supply voltage levels are equivalent by comparing the first and second voltage identification signals.

11. The control system of claim 1, said control system further comprising:

means coupled to said first and second central processing units and to said means for providing the indication of the second stopclock request for providing an indication of when a first supply voltage level of the first central processing unit is equivalent to a second supply voltage level of the second central processing unit, and wherein said means for providing the indication of the second stopclock request is enabled when said means for providing the indication of the equivalency of the supply voltage levels indicates the supply voltage levels of the first and second central processing units are equivalent.

12. The control system of claim 11, wherein said means for providing the indication of the equivalency of the supply voltage levels further receives a first voltage identification signal indicative of the first supply voltage level and a second voltage identification signal indicative of the second supply voltage level, and wherein said means for providing the indication of the equivalency of the supply voltage levels determines if the supply voltage levels are equivalent by comparing the first and second voltage identification signals.

13. A computer system, the computer system comprising:

a first central processing unit capable of entering a first known stopclock mode after receiving an indication of a first stopclock request and remaining in the first known stopclock mode as long as the indication of the first stopclock request is received;

a second central processing unit capable of entering a second known stopclock mode after receiving an indication of a second stopclock request and remaining in the second known stopclock mode as long as the indication of the second stopclock request is received;

a converter sized for powering the first or the second central processing unit in a normal mode of operation;

means for providing a grant indication of when the first central processing unit enters the first known stopclock mode and when the second central processing unit enters the second known stopclock mode;

means coupled to the first central processing unit and to said means for providing the grant indication for providing the indication of the first stopclock request to the first central processing unit for placing the first central processing unit in the first known stopclock mode for a first predetermined time after said means for providing the grant indication indicates the first central processing unit has entered the first known stopclock mode;

means coupled to the second central processing unit, to said means for providing the grant indication and to said means for providing the indication of the first stopclock request signal for providing an indication of the second stopclock request to the second central processing unit for placing the second central processing unit in the second known stopclock mode for a second predetermined time after said means for providing the grant indication indicates the second central processing unit has entered the second known stopclock mode; and wherein said means for providing the indication of the first stopclock request and said means for providing the indication of the second stopclock request cooperate so that either the first central processing unit or the second central processing unit is in the known first or second stopclock mode.

14. The computer system of claim 13, wherein the first central processing unit is not in the first stopclock mode when the second central processing unit is in the second stopclock mode.

15. The control system of claim 13, wherein said means for providing the indication of the first stopclock request includes a 555 timer circuit to indicate the first predetermined time.

16. The control system of claim 13, wherein said means for providing the indication of the second stopclock request includes a 555 timer circuit to indicate the second predetermined time.

17. The computer system of claim 13, said control system further comprising:

means coupled to said means for providing the indication of the first stopclock request for providing an indication that only one converter is available to provide power to the first and second central processing units, and wherein said means for providing the indication of the first stopclock request is enabled when said means for providing the indication that only one converter is available indicates that only one converter is available to provide power to the first and second central processing units.

18. The computer system of claim 13, said control system further comprising:

means coupled to said means for providing the indication of the second stopclock request for providing an indication that only one converter is available to provide power to the first and second central processing units, and wherein said means for providing the indication of the second stopclock request is enabled when said means for providing the indication that only one converter is available indicates that only one converter is available to provide power to the first and second central processing units.

19. The computer system of claim 13, said control system further comprising:

means coupled to said means for providing the indication of the first stopclock request for providing an indication of an over temperature condition of one or both of the central processing units, and wherein said means for providing the indication of the first stopclock request is enabled when said means for providing the indication of the over temperature condition indicates the temperature of one or both of the central processing units has exceeded a predetermined maximum temperature.

20. The computer system of claim 13, said control system further comprising:

means for providing an indication of an over temperature condition of one or both of the central processing units, and wherein said means for providing the indication of the second stopclock request is enabled when said means coupled to said means for providing the indication of the second stopclock request for providing the indication of the over temperature condition indicates the temperature of one or both of the central processing units has exceeded a predetermined maximum temperature.

21. The computer system of claim 13, said computer system further comprising:

means coupled to said first and second central processing units and to said means for providing the indication of the first stopclock request for providing an indication of when a first supply voltage level of the first central processing unit is equivalent to a second supply voltage level of the second central processing unit, and wherein said means for providing the indication of the first stopclock request is enabled when said means for providing the indication of the equivalency of the supply voltage levels indicates the supply voltage levels of the first and second central processing units are equivalent.

22. The computer system of claim 21, wherein said means for providing the indication of the equivalency of the supply voltage levels further receives a first voltage identification signal indicative of the first supply voltage level and a second voltage identification signal indicative of the second supply voltage level, and wherein said means for providing the indication of the equivalency of the supply voltage levels determines if the supply voltage levels are equivalent by comparing the first and second voltage identification signals.

23. The computer system of claim 13, said computer system further comprising:

means coupled to said first and second central processing units and to said means for providing the indication of the second stopclock request for providing an indication of when a first supply voltage level of the first central processing unit is equivalent to a second supply voltage level of the second central processing unit, and wherein said means for providing the indication of the second stopclock request is enabled when said means for providing the indication of the equivalency of the supply voltage levels indicates the supply voltage levels of the first and second central processing units are equivalent.

24. The computer system of claim 23, wherein said means for providing the indication of the equivalency of the supply voltage levels further receives a first voltage identification signal indicative of the first supply voltage level and a second voltage identification signal indicative of the second supply voltage level, and wherein said means for providing the indication of the equivalency of the supply voltage levels determines if the supply voltage levels are equivalent by comparing the first and second voltage identification signals.

25. A method for providing power to both a first and second central processing unit by a converter only sized for powering either the first and second central processing unit in a normal mode of operation, the first central processing unit capable of entering a first known stopclock mode after receiving an indication of a first stopclock request and remaining in the first known stopclock mode as long as the indication of the first stopclock request is received, the second central processing unit capable of entering a second known stopclock mode after receiving an indication of a second stopclock request and remaining in the second known stopclock mode as long as the indication of the second stopclock request is received, the computer system capable of providing an indication of when the first central processing unit enters the first known stopclock mode or the second central processing unit enters the second known stopclock mode, the method comprising the steps of:

detecting when the first central processing unit enters the first known stopclock mode;

detecting when the second central processing unit enters the second known stopclock mode;

providing an indication of the first stopclock request to the first central processing unit for placing the first central processing unit in the first known stopclock mode for a first predetermined time after the first central processing unit enters the first known stopclock mode;

providing an indication of the second stopclock request to the second central processing unit for placing the second central processing unit in the second known stopclock mode for a second predetermined time after the second central processing unit enters the second known stopclock mode; and staggering the indications of the first and second stopclock requests so that either the first central processing unit or the second central processing unit is in the first or second known stopclock mode.

26. The method of claim 25, wherein said step of staggering ensures the first central processing unit is not in the first stopclock mode when the second central processing unit is in the second stopclock mode.

* * * * *